United States Patent
Matyas, Jr. et al.

(10) Patent No.: US 6,928,163 B1
(45) Date of Patent: Aug. 9, 2005

(54) METHODS, SYSTEMS AND COMPUTER PROGRAM PRODUCTS FOR GENERATING USER-DEPENDENT RSA VALUES WITHOUT STORING SEEDS

(75) Inventors: Stephen Michael Matyas, Jr., Manassas, VA (US); Mohammad Peyravian, Cary, NC (US); Allen Leonid Roginsky, Durham, NC (US); Nevenko Zunic, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/357,483

(22) Filed: Jul. 20, 1999

(51) Int. Cl.[7] ............................................... H04L 9/00
(52) U.S. Cl. ......................................... 380/30; 380/28
(58) Field of Search ............................. 380/28, 30, 46, 380/45

(56) References Cited

U.S. PATENT DOCUMENTS

| | | | |
|---|---|---|---|
| 4,878,246 A | 10/1989 | Pastor et al. ................... | 380/44 |
| 4,944,007 A | 7/1990 | Austin ........................... | 380/21 |
| 5,199,070 A | 3/1993 | Matsuzaki et al. ............ | 380/30 |
| 5,319,705 A | 6/1994 | Halter et al. .................... | 705/54 |
| 5,541,994 A | 7/1996 | Tomko et al. ................. | 380/30 |
| 5,680,460 A | 10/1997 | Tomko et al. ................. | 380/23 |
| 5,709,114 A | 1/1998 | Dawson et al. ............... | 70/278 |
| 6,035,398 A | 3/2000 | Bjorn ........................... | 713/186 |
| 6,065,117 A | 5/2000 | White .......................... | 713/159 |
| 6,215,874 B1 * | 4/2001 | Borza et al. ................... | 380/46 |
| 6,219,794 B1 * | 4/2001 | Soutar et al. ............... | 713/202 |
| 6,226,383 B1 | 5/2001 | Jablon ........................... | 380/30 |
| 6,307,938 B1 | 10/2001 | Matyas, Jr. et al. ........... | 380/44 |
| 6,687,375 B1 * | 2/2004 | Matyas et al. ................. | 380/45 |

OTHER PUBLICATIONS

Peyravian, Generating Uwer–Based Cryptographic Keys and Random Numbers, Computer and security, 1999, vol. 18, pp. 619–626.*
Rivest, A method for Obtaining Digital Signature and Public–Key Cryptosystems, Feb. 1978, pp. 120–126.*
Matyas Jr. et al. "A New Procedure for Generating Prime Numbers for the RSA Digital Signature Algorithm," IBM Security ITS, Poughkeepsie, NY 1998.
Rivest et al. "A Method for Obtaining Digital Signatures and Public Key Cryptosystems," *Communications of the ACM*, vol. 21, No. 2, Feb. 1978, pp. 120–126.
U.S. Appl. No. 09/324,308, filed Jun. 2, 1999.

* cited by examiner

*Primary Examiner*—Kim Vu
*Assistant Examiner*—Paula Klimach
(74) *Attorney, Agent, or Firm*—Myers Bigel Sibley & Sajovec; Stephen A. Calogero

(57) ABSTRACT

Methods, systems and computer program products are provided which allow for generation and authentication of RSA encrypted values by utilizing a combination of entity specific information such as biometric information and by incorporating information about the secret seeds into the cryptographic values p and q utilized to encrypt the information. Thus, authentication of an encrypted message may be achieved without requiring storage of the secret seed values utilized to generate the cryptographic values. Furthermore the present invention assures that users with different entity specific information utilize different p and q values.

57 Claims, 8 Drawing Sheets

US 6,928,163 B1

METHODS, SYSTEMS AND COMPUTER PROGRAM PRODUCTS FOR GENERATING USER-DEPENDENT RSA VALUES WITHOUT STORING SEEDS

RELATED APPLICATIONS

The present application is related to commonly assigned U.S. patent application Ser. No. 09/324,418, entitled "METHODS, SYSTEMS AND COMPUTER PROGRAM PRODUCTS FOR GENERATING USER-DEPENDENT CRYPTOGRAPHIC KEYS," the disclosure of which is incorporated herein by reference as if set forth fully. The present application is also related to commonly assigned U.S. patent application Ser. No. 09/324,308, entitled "METHODS, SYSTEMS AND COMPUTER PROGRAM PRODUCTS FOR GENERATING USER-DEPENDENT RSA KEYS," the disclosure of which is incorporated herein by reference as if set forth fully.

FIELD OF THE INVENTION

The present invention relates to cryptography and more particularly to the generation of cryptographic key values for RSA asymmetric cryptosystems.

BACKGROUND OF THE INVENTION

Asymmetric (or public) key cryptosystems use two different keys that are not feasibly derivable from one another, one for encryption and another for decryption. A person wishing to receive messages, generates a pair of corresponding encryption and decryption keys. The encryption key is made public, while the corresponding decryption key is kept secret. Anyone wishing to communicate with the receiver may encrypt a message using the receiver's public key. Only the receiver may decrypt the message, since only he has the private key. Asymmetric-key cryptosystems may also be used to provide for digital signatures, in which the sender encrypts a signature message using his private key. Because the signature message can only be decrypted with the sender's public key, the recipient can use the sender's public key to confirm that the signature message originated with the sender. One of the best-known asymmetric-key cryptosystems is the RSA, named for its originators Rivest, Shamir and Adleman. One version of RSA is defined by ANSI Standard X9.31-1998.

RSA is widely used in many cryptographic systems. RSA gets its security from the difficulty of factoring large prime numbers. The RSA public and private keys are derived from two randomly selected large prime numbers.

The general way to derive the two RSA keys is as follows. First choose two random large prime numbers p and q. Compute $N=p \times q$, which is referred to as the public modulus. Then randomly choose the public key e such that e and $(p-1) \times (q-1)$ are relatively prime. Finally, compute the private key d such that $d = e^{-1} \mod((p-1) \times (q-1))$. RSA encryption and decryption formulas are straightforward. To encrypt a message m, compute $c = m^e \mod N$, where c is the ciphertext. To decrypt c, compute $m = c^d \mod N$.

It has been suggested that two users with different moduli might have a common prime factor in their moduli, either by accident or because of a poor design (design flaw) in the system. If $N_1 = p_1 \times q_1$ and $N_2 = p_2 \times q_2$, where $p_1 = p_2$, then it is easy to find $p_1$ or $p_2$ given $N_1$ and $N_2$, i.e., an efficient algorithm exists to find the common factor $p_1$ or $p_2$ given $N_1$ and $N_2$. If such a common prime factor were to exist, and this fact were discovered, then it would also be an easy matter to factor each modulus into its prime factors. This, of course, would allow the private keys to be computed from the corresponding public keys, and hence for the security of the keys to be compromised.

One of the drawbacks of the existing methods for RSA key generation is that six seed values may need to be stored in case an audit will be performed. These seeds will demonstrate that the primes were indeed generated at random and that the user was not trying to choose the primes with some peculiar properties. Such saving of seed values may result in a security exposure as the seed values could be illicitly obtained and used to generate the RSA key values. In commonly assigned United States Patent Application entitled "METHOD, SYSTEM AND APPARATUS FOR GENERATING SELF-VALIDATING PRIME NUMBERS" filed Jul. 10, 1998, Ser. No. 09/114,024, the disclosure of which is incorporated herein by reference, a scheme was developed that incorporated the knowledge of the seeds into the primes themselves. Therefore, the seeds need not be stored in order to pass an audit. However, the generated primes were not necessarily unique and could not be associated with a particular user.

In general, mechanisms for differentiating between users are known. For example, a particular individual can be identified or verified through a user identifier (such as a globally unique name) or biometric data (such as fingerprint, hand geometry, iris pattern, facial features, voice characteristics, handwriting dynamics, earlobe characteristics, etc.).

As is well known to those having skill in the art, biometric information is one or more behavioral and/or physiological characteristics of an individual. Biometric identification and/or verification uses a data processing system to enable automatic identification and/or verification of identity by computer assessment of a biometric characteristic. In biometric verification, biometric information is verified for a known individual. In biometric identification, biometric information for an individual is compared to known biometric information for many individuals in order to identify the individual.

Biometric identification/verification systems, methods and computer program products can measure one or more of the following behavioral and/or physiological characteristics of an individual: fingerprint, hand geometry, iris pattern, facial features, voice characteristics, handwriting dynamics, earlobe characteristics and keystroke dynamics. Other biometric characteristics may be used. Applications using biometric technologies include biometric check cashing machines, payment systems that substitute biometric data for personal identification numbers, access control systems that use biometric data, biometric employee time and attendance recording and biometric passenger control for transportation. Many other applications may utilize biometric information for identification and/or verification. See the publications entitled "*Biometrics, Is it a Viable Proposition for Identity Authentication and Access Control*", to Kim, Computers & Security, Vol. 14, 1995, pp. 205–214; "*A Robust Speaker Verification Biometric*", to George et al., Proceedings, the IEEE 29$^{th}$ International Carnahan Conference on Security Technology, Oct. 1995, pp. 41–46; "*On Enabling Secure Applications Through Off-line Biometric Identification*", to Davida et al., Proceedings of the IEEE Computer Society Symposium on Research in Security and Privacy, 1998, pp. 148–157; and "*Biometric Encryption: Information Privacy in a Networked World*", to Brown et al., EDI Forum: The Journal of Electronic Commerce, v. 10, No. 3, 1997, pp. 37–43. However, while biometric identification and user identification may allow for identification of users, these existing uses may not allow for authentication of the source of encryption keys.

In the above cited Davida et al. publication, in Section 5.2, it was proposed that biometrics could be used with or as keys. However, Davida et al. assumes that the biometric information is secret information. Furthermore, Davida et al. may not work for any size key and describes a procedure which may not allow for pre-computing information for generation of a key value. Furthermore, the proposal of Davida et al. may allow two users to generate the same key values and, thus, does not assure that the generated keys are disjoint.

In light of the above discussion, a need exists for improvements in the generation of encryption keys for RSA cryptosystems so as to allow authentication of user's generated values without requiring storage of the secret seed values.

SUMMARY OF THE INVENTION

In view of the above discussion, it is an object of the present invention to provide cryptographic keys which may be authenticated.

A further object of the present invention is to provide for the generation of cryptographic keys which may be audited to determine the user who generated the cryptographic keys.

A further object of the present invention is to provide RSA keys which satisfy the requirements of the ANSI Standard X9.31-1998.

Yet another object of the present invention is to provide RSA keys which are disjoint for different users.

These and other objects of the present invention may be provided by methods, systems and computer program products which generate an RSA cryptographic value utilizing user specific information (B) about a user, a first secret seed value ($W_p$), a second secret seed value ($W_q$) and a third, publicly known, randomization value (IV) having a first portion ($IV_p$) and a second portion ($IV_q$). A potential range of RSA cryptographic values are divided into a first interval and a second interval and a first initial value ($XX_p$) is generated based on the first secret seed value ($W_p$), the second secret seed value ($W_q$) and the first portion of the third randomization value ($IV_p$). The first initial value is mapped to a user specific segment of the first interval utilizing the obtained user specific information (B) to provide a mapped first initial value ($X_p$). A first user dependent RSA cryptographic value (p) is selected from the user specific segment of the first interval utilizing the mapped first initial value as a starting point for a search for the first user dependent RSA key value. A second initial value ($XX_q$) is generated based on the first user dependent RSA encryption value (p), the second secret seed value ($W_q$) and the first portion of the third randomization value ($IV_q$). The second initial value is mapped to a user specific segment of the second interval utilizing the user specific information to provide a mapped second initial value ($X_q$). A second user dependent RSA cryptographic value (q) is then generated from the user specific segment of the second interval utilizing the mapped second initial value as a starting point for a search for the second user dependent RSA cryptographic value.

In a further embodiment of the present invention, auxiliary prime divisors corresponding to the first user dependent RSA key value (p) and the second user dependent RSA key value (q) are also generated based upon the first secret seed value ($W_p$), the second secret seed value ($W_q$) and the third randomization value (IV).

In such a case, where $p_0$ is a publicly known prime number whose length is at least n bits (where p and q have a length of n bits) and g is a public generator, the auxiliary prime divisors may be generated by concatenating the first secret seed value ($W_p$), the second secret seed value ($W_q$) and the third randomization value (IV) so as to provide an exponent value (X). An initial random value is then generated by determining $Y=g^x(\mod p_0)$ so as to provide initial prime search values. The most significant bit of the initial prime search values is set to "1" to provide final prime search values. The auxiliary prime divisors are then selected as the smallest prime value greater than or equal to the final prime search values. Furthermore, a new first secret seed value ($W_p$), a new second secret seed value ($W_q$) or a new third randomization value (IV) may be selected if the length of at least one of the prime divisors is greater than the length of the final prime search values. In such a case, the prime divisors are regenerated if the length of at least one of the prime divisors is greater than the length of the final prime search values.

In a still further embodiment, the initial prime search values have a first length if a public encryption exponent (e) has an odd value and a second length if the public encryption exponent (e) has an even value. In particular, the first and second lengths are fixed, and preferably fixed so that the first length is 120 bits and the second length is 118 bits.

In further embodiments of the present invention, the user specific segments comprise the segments $[A+(B(C-A))/2^b, A+((B+1)(C-A))/2^b]$ wherein A and C are the endpoints of the respective intervals and the user specific information comprises b bits. In particular, where the RSA cryptographic values comprise n bits, the first interval may comprise RSA cryptographic values from the set of $[\sqrt{2}(2^{n-1}), 2^{n-1}+2^{n-3/2}]$ and the second interval may comprise RSA cryptographic values from the set of $[2^{n-1}+2^{n-3/2}, 2^n]$. Also, where the binary size of the RSA values are 2n and a size m is n-b-2, then the mapping may be achieved by linearly mapping the first initial value to a user specific segment of the first interval utilizing the obtained user specific information (B) utilizing the linear mapping function $$G_{1,U}(x) = 4\left(1 - \frac{1}{\sqrt{2}}\right)x + \sqrt{2}\,2^{n-1} + 4\left(1 - \frac{1}{\sqrt{2}}\right)(B-1)2^{m-1}.$$

The mapped first initial value ($X_p$) is then selected as the largest integer value which is not greater than the first initial value ($XX_p$) mapped utilizing the mapping function $G_{1,U}$. Similarly, the second initial value may be linearly mapped to a user specific segment of the second interval utilizing the obtained user specific information (B) by utilizing the linear mapping function.

$$G_{2,U}(x) = 4\left(1 - \frac{1}{\sqrt{2}}\right)x + 2^{n-1} + 2^{n-3/2} + 4\left(1 - \frac{1}{\sqrt{2}}\right)(B-1)2^{m-1}.$$

The mapped second initial value ($X_q$) is the selected as the largest integer value which is not greater than the second initial value ($XX_q$) mapped utilizing the mapping function $G_{2,U}$.

In a particular embodiment of the present invention, the user specific information is biometric information. The user specific information may also be a globally unique user identification.

In another embodiment of the present invention, if a candidate for p is considered outside the range of RSA cryptographic values in the user specific segment of the first interval then at least one of a new first secret seed value ($W_p$), a new second secret seed value ($W_q$) or a new third randomization value (IV) is selected. If a candidate for q is considered outside the range of RSA key values in the user specific segment of the second interval then at least one of a new first secret seed value ($W_p$), a new second secret seed value ($W_q$) or a new third randomization value (IV) is also selected. In either case, the value generation is restarted. Similarly, if $2^{16}-1$ candidates for p have been rejected in selecting the first user dependent RSA cryptographic value or if $2^{16}-1$ candidates for q have been rejected in selecting the second user dependent RSA cryptographic value, then at least one of a new first secret seed value ($W_p$), a new second secret seed value ($W_q$) or a new third randomization value (IV) is selected and value generation restarted.

In one embodiment of the present invention, the first initial value is generated by mixing the concatenation of $W_q$ and $IV_q$ utilizing a publicly known mixing function, concatenating $W_p$ and $IV_p$ and EXCLUSIVE-ORing the mixed concatenation of $W_q$ and $IV_q$ and the concatenation $W_p$ and $IV_p$ to provide the first initial value ($XX_p$). The second initial value is generated by EXCLUSIVE ORing p and $IV_p$, mixing the EXCLUSIVE OR of p and $IV_p$ utilizing the publicly known mixing function, concatenating $W_q$ and $IV_q$ and EXCLUSIVE-ORing the mixed EXCLUSIVE OR of p and $IV_p$ and the concatenation $W_q$ and $IV_q$ to provide the second initial value ($XX_q$).

Furthermore, the generated RSA cryptographic values p and q may subsequently be authenticated based on the cryptographic values themselves. Such authentication may be accomplished by recovering two candidate prime values utilizing the RSA public modulus (n) and the private signature exponent (d) and establishing a first of the two prime values as a first candidate key value (p') and the second of the two prime values as a second candidate key value (q'). First and second candidate seed values $W_p'$ and $W_q'$ are recovered from the first and second candidate key values p' and q' and from the third publicly known seed value IV. First and second RSA key values p" and q" are then generated utilizing $W_p'$ and $W_q'$ and IV and compared with p' and q' to authenticate the cryptographic values. The recovered p' and q' may also be determined to not be authentic if p' and q' are values outside the user defined segments of the first and second intervals. The first of the two prime numbers is a smaller of the two prime numbers.

In a particular embodiment of the present invention, the first and second candidate seed values $W_p'$ and $W_q'$ are recovered from the first and second candidate key values p' and q' and from the third publicly known seed value IV by inverse mapping the second candidate value q' to provide a first initial value $S_q$. The first candidate key value p' and $IV_p$ are EXCLUSIVE ORed, and the EXCLUSIVE OR of the first candidate key value p' and $IV_p$ mixed with the publicly known mixing function. The mixed EXCLUSIVE OR of the first candidate key value p' and $IV_p$ is EXCLUSIVE ORed with $IV_q$ to provide a first known value having a length (j). It is then determined if the value corresponding to the j least significant bits of $S_q$ are less than the first known value. The n-j most significant bits of the mixed concatenation of the first candidate key value p' and $IV_p$ is EXCLUSIVE ORed with the n-j most significant bits of $S_q$ if the value corresponding to the j least significant bits of the $S_q$ is less than the first known value to provide the second candidate seed value or with 1 subtracted from the value corresponding to the n-j most significant bits of $S_q$ if the value corresponding to the j least significant bits of the first subsequent value are not less than the first known value to provide the second candidate seed value. The first candidate value p' is also inverse mapped to provide a second initial value $S_p$. The second candidate seed value is concatenated with $IV_q$ and mixed with the publicly known mixing function. The mixed concatenation of the second candidate seed value and $IV_q$ is EXCLUSIVE ORed with $IV_p$ to provide a second known value having a length (j). It is then determined if the value corresponding to the j least significant bits of $S_p$ are less than the second known value and the n-j most significant bits of the mixed concatenation of the second candidate seed value and $IV_q$ are EXCLUSIVE ORed with the n-j most significant bits of $S_p$ if the value corresponding to the j least significant bits of $S_p$ are less than the second known value to provide the first candidate seed value and with 1 subtracted from the value corresponding to the n-j most significant bits of $S_p$ if the value corresponding to the j least significant bits of $S_p$ are not less than the second known value to provide the first candidate seed value.

By mapping a user specific range of values onto the potential range of prime values, the present invention can guarantee that different users will select prime values from different ranges. Thus, the range of prime values from which an RSA prime is selected may be used to authenticate and audit the prime after generation. If a prime is not from the user specific range mapped onto the range of potential prime values, then the key value was not from the user corresponding to the user specific information.

As will further be appreciated by those of skill in the art, the present invention may be embodied as methods, apparatus/systems and/or computer program products.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention can be embodied as systems, methods, or a computer program products for generating a user-dependent RSA cryptographic primes and keys which are unique. Furthermore, the present invention may also provide for verification of encrypted data without requiring a user to store the secret seed values which may expose the seed values to being discovered. As will be appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

Figure 1:
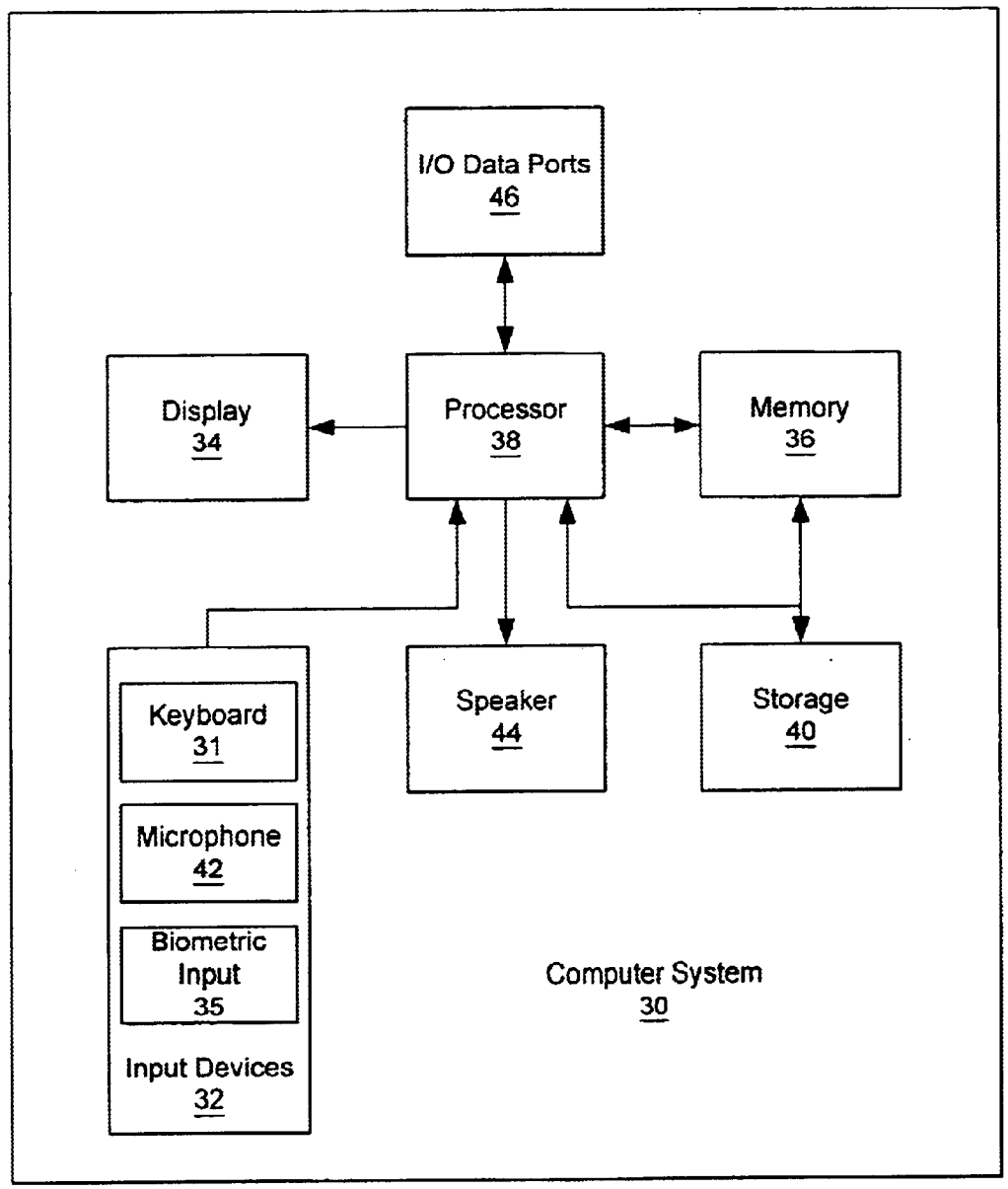
FIG. 1 is diagram of a data processing system that can be used with the present invention.

Referring now to FIG. 1, an exemplary embodiment of a computer system 30 in accordance with the present invention typically includes input devices 32, such as a keyboard or keypad 31, a microphone 42 and/or preferably, a biometric information input device 35. The computer system 30 also preferably includes a display 34 and a memory 36 that communicate with a processor 38. The computer system 30 may further include a speaker 44 and an I/O data port(s) 46 that also communicate with the processor 38. The I/O data ports 46 can be used to transfer information between the computer system 30 and another computer system or a network (e.g., the Internet). FIG. 1 also illustrates that computer system 30 may include a storage device 40 which communicates with memory 36 and processor 38. Such a storage device may be any type of data storage device as described above. These components are included in many conventional computer systems (e.g., desktop, laptop, or handheld computers) and their functionality is generally known to those skilled in the art.

Furthermore, while the present invention is described with respect to the computer system 30, as will be appreciated by those of skill in the art, the present invention may be incorporated into many other devices where RSA cryptographic primes and/or keys are generated and/or authenticated and, thus, may comprise an embedded function in many other devices. Thus, the present invention should not be construed as limited to use in computer systems such as illustrated in FIG. 1 but may be incorporated in any device having sufficient processing capabilities to carry out the operations described below.

Figure 2:
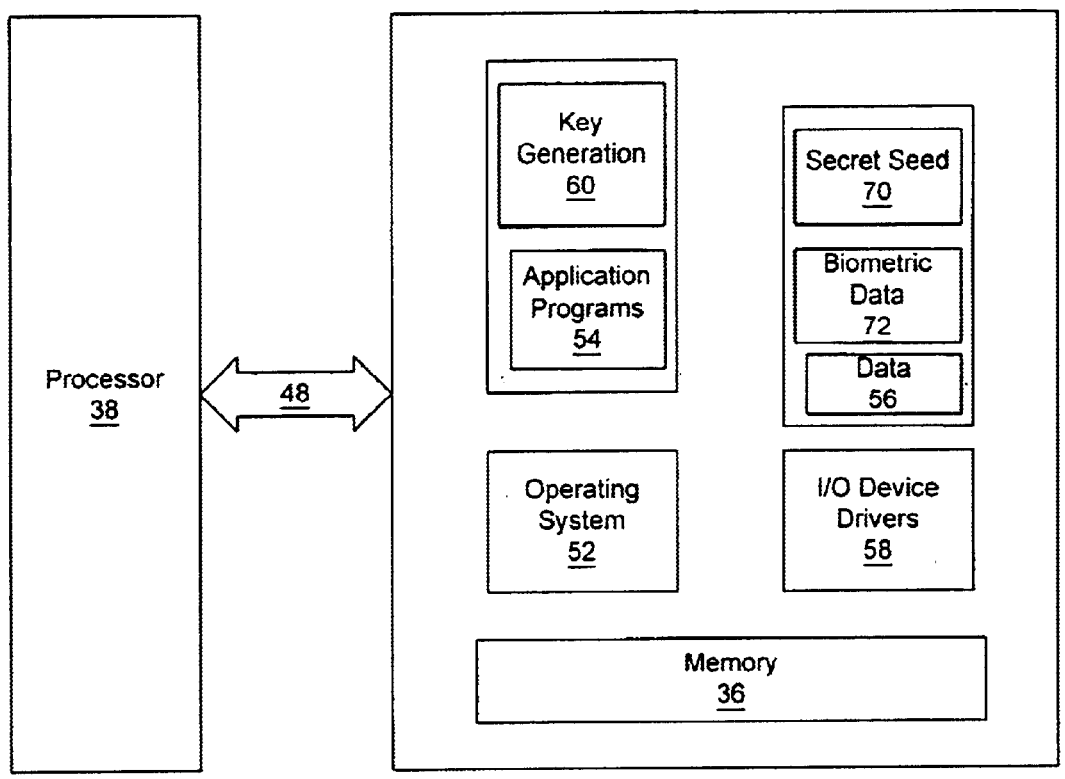
FIG. 2 is a detailed view of a data processing system that can be used with the present invention.

FIG. 2 is a more detailed block diagram of the computer system 30 that illustrates one application of the teachings of the present invention. The processor 38 communicates with the memory 36 via an address/data bus 48. The processor 38 can be any commercially available or custom microprocessor or other processing system capable of carrying out the operations of the present invention. The memory 36 is representative of the overall hierarchy of memory devices containing the software and data used to implement the functionality of the computer system 30. The memory 36 can include, but is not limited to, the following types of devices: cache, ROM, PROM, EPROM, EEPROM, flash, SRAM, and DRAM.

As shown in FIG. 2, the memory 36 may hold four major categories of software and data used in the computer system 30: the operating system 52; the application programs 54; the input/output (I/O) device drivers 58; and the data 56. The I/O device drivers 58 typically include software routines accessed through the operating system 52 by the application programs 54 to communicate with devices such as the input devices 32, the display 34, the speaker 44, the microphone 42, the I/O data port(s) 46, and certain memory 36 components. The application programs 54 comprise the programs that implement the various features of the computer system 30 and preferably include at least one application module or object for RSA key generation and/or authentication 60 which carries out the operations of the present invention as described below. Finally, the data 56 represents the static and dynamic data used by the application programs 54, operating system 52, I/O device drivers 58, and any other software program that may reside in the memory 36. As illustrated in FIG. 2, the data 56 preferably includes a secret seed value 70 and biometric or other user specific data 72. However, as will be appreciated by those of skill in the art, the secret seed values need not be maintained in memory. Furthermore, the biometric or user specific data may be publicly known. Additional intermediate data (not shown) may also be stored in memory. Furthermore, while the present invention is described as an application executing on computer system 30, as will be appreciated by those of skill in the art, the present invention may be implemented in any number of manners, including incorporation in operating system 52 or in an I/O device driver 58.

The present invention will now be described with respect to FIGS. 3, 4 and FIGS. 6 through 8. FIGS. 3, 4 and 6 through 8 are flowchart illustrations of embodiments of the present invention. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart or block diagram block or blocks. The computer program instructions may be executed by a processor to cause a series of operational steps to be performed by the processor to produce a computer implemented process such that the instructions which execute on the processor provide steps for implementing the functions specified in the flowchart or block diagram block or blocks.

Accordingly, blocks of the block diagrams and/or flowchart illustrations support combinations of means for performing the specified functions, combinations of steps for performing the specified functions and program instruction means for performing the specified functions. It will also be understood that each block of the block diagrams and/or flowchart illustrations, and combinations of blocks in the block diagrams and/or flowchart illustrations, can be implemented by special purpose hardware-based systems which perform the specified functions or steps, or combinations of special purpose hardware and computer instructions.

The present invention provides for generating and authenticating RSA cryptographic primes and/or keys using user specific information such as users' user identification (userID) data as well as users' biometric data. While userID data and biometric data are fundamentally different, the two data types have characteristics in common which may be exploited in providing user-dependent cryptographic primes and/or keys. For example, some of the differences in userID and biometric data can be identified as follows:

1) A userID is assigned to a user, whereas biometric data is obtained or derived from the user. Generally speaking, a user's userID is an independent variable, whereas a user's biometric data is a dependent variable.
2) A user's userID can be changed. A user's biometric data cannot be changed. At most, a user can attempt to switch from one biometric to another biometric (e.g., fingerprint to hand geometry).
3) Generally, the set or space of user identifiers may be dense, making it feasible to enumerate the set of user identifiers. Generally, the space of user biometric data is not dense, making it infeasible to enumerate the biometric data for each user.
4) Biometric data can be used to authenticate a user while userID data cannot be used to authenticate a user.
5) A userID is a constant. User biometric data is not constant.

However, the similarities in userID and biometric data which may be utilized to provide user-dependent cryptographic keys can be identified as follows:

1) A userID is different for each user and biometric data is generally different for each user. Note that, in some cases, it may happen that the biometric data for one user overlaps (in whole or in part) with another user. The degree to which this may occur can depend on a combination of the biometric method being employed and the sensitivity of the biometric reader devices being employed.
2) A userID data is non-secret data. Biometric data should be considered as non-secret data, although in some vendor proprietary systems user biometric data is encrypted (i.e., protected). Since there is no practical way to prevent the capture of user biometric data outside the biometric system, it is false to assume that the secrecy of user biometric data can be maintained over time.
3) Biometric data, like userID data, can be used to identify users. In fact, in some sense, biometric data offers a better mechanism for user identification, since biometric data provides a mechanism of positive identification, whereas userID data, until verified via a separate authentication protocol, is only representative of a claimed identity.

One potential advantage to using biometric data as the user specific information is that with biometric data, there is potentially an easy mechanism for the user to prove their identity, especially if the user carries their biometric certificate on a portable token (e.g., smart card). With a userID, the presumed or claimed identity of the user is known, however, the user to whom the key or cryptographic variable belongs will not necessarily have an easy means to prove that they are that user. A user will not always carry sufficient credentials to prove their identity (e.g., birth certificate or passport).

The present invention provides for RSA encryption which may comply with the ANSI standards. The public RSA key N that needs to be generated for RSA encryption may have a binary length of 2n. The prime numbers p and q whose product is N must be within the range $\sqrt{2}(2^{n-1}) < p, q < 2^n$. User-specific information, denoted by B, can be encoded in b bits of data and these data are different from one user to another. When the user-specific data is biometric information, either the "biometric sample" taken in real-time or the pre-computed reference "biometric template" of a user may be utilized. In either case it is assumed that the biometric data is constant. Biometric data need not be secret. It is further preferred that the b bits allows for expressing any fuzziness included in the biometric data, if biometrics are used as the user-specific data.

The ANSI standard requires that the primes p and q satisfy the following properties:

1. p−1 has a prime divisor, $p_1$, whose binary length is between 100 and 120 bits.
2. p+1 has a prime divisor, $p_2$, whose binary length is between 100 and 120 bits.
3. q−1 has a prime divisor, $q_1$, whose binary length is between 100 and 120 bits.
4. q+1 has a prime divisor, $q_2$, whose binary length is between 100 and 120 bits.
5. $|p-q| > 2^{n-100}$.
6. Both (p−1)/2 and (q−1)/2 must be mutually prime with the RSA public exponent e.
7. If the RSA public exponent e is even then it is required that p=3(mod8) and q=7(mod8).

The present invention can satisfy each of these criteria, thus, allowing compliance with the ANSI RSA standard.

While $p_1$, $p_2$, $q_1$ and $q_2$ are each to be between 100 and 120 bits in length, the present invention sets these values which aids in recovering the seed values from later derived p and q values. In the present example, these values are each exactly 120 bits long if e is odd and exactly 118 bits long when e is even. The reason for choosing the slightly shorter primes when e is even is that in this case the primes p and q are selected from a sequence of numbers that differ from each other by $8p_1p_2$ or $8q_1q_2$, rather than by $p_1p_2$ or $q_1q_2$ in the case of an odd e. It is necessary to know what the maximum size of the step in the search procedure for p and q and this is one way to accomplish it.

Figure 3:
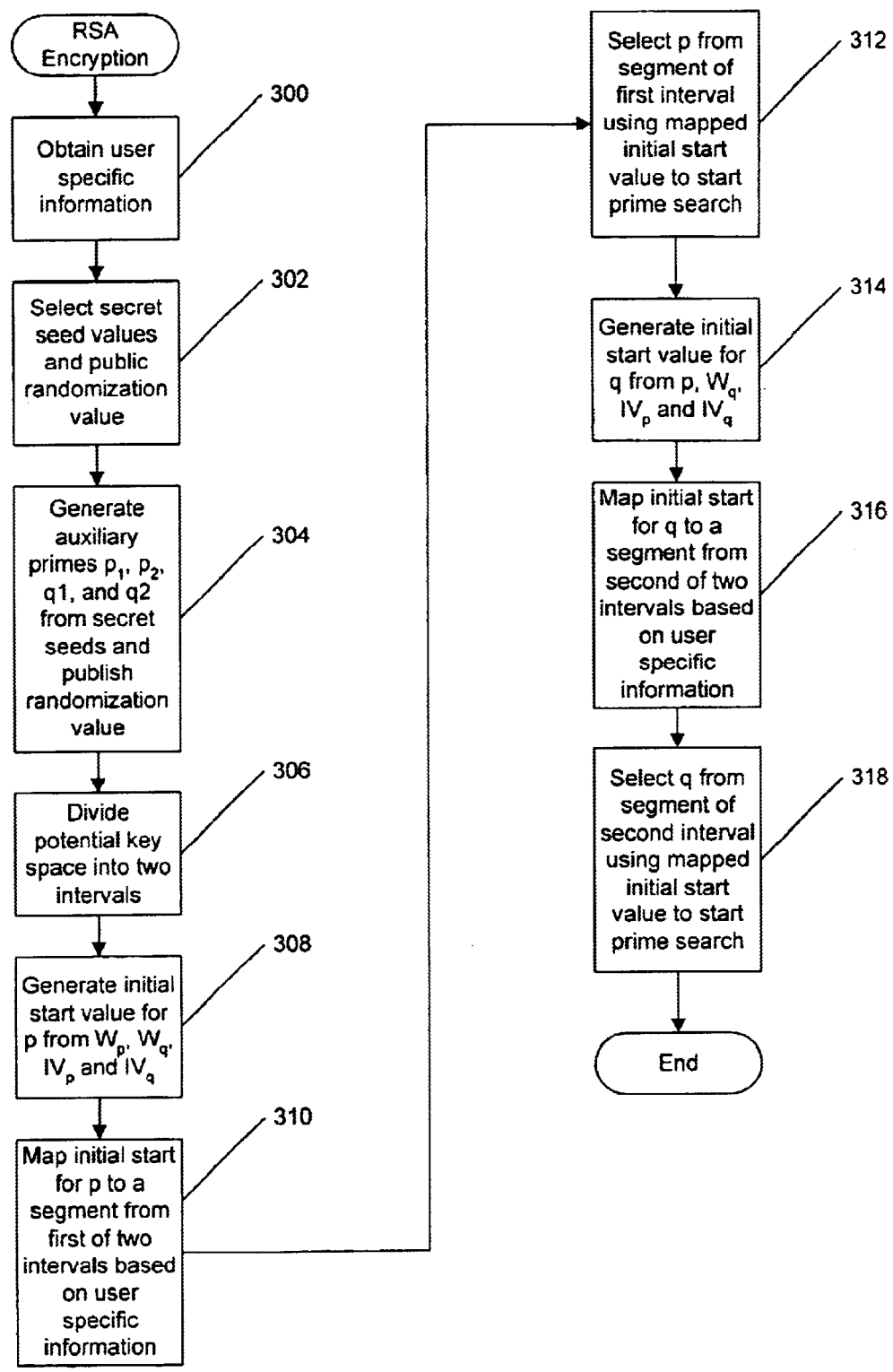
FIG. 3 is a flowchart illustrating operations for user specific encryption according to an embodiment of the present invention.

FIG. 3 illustrates an embodiment of the present invention which can guarantee that two different users will generate different cryptographic values and which incorporates information about the secret seed values used in the encryption which allows for authentication of the cryptographic values without resort to stored secret seed values. As seen in FIG. 3, the user specific information, such as biometric information or a user identification, is obtained (block 300). The user-specific data B may be a binary string of length b. Also obtained are secret seed values $W_p$ and $W_q$ and a public randomization value IV (block 302). The secret seed values need not be obtained from a stored location but may be generated at the time of encryption. In the present description, the value of n−b−2 will be denoted as m. Both $W_p$ and $W_q$ are secret values, each has the length of m−256 bits. The IV parameter may be non-secret. It is used for the randomization of the entire prime generation process, so that even the same user starting with the same pair of secret values $W_p$ and $W_q$ will generate different primes when the IV parameter is altered. This IV value is represented as a concatenation of two binary strings, IV=$IV_p \| IV_q$, where the length of each of $IV_p$ and $IV_q$ is 32 bytes (256 bits) and the length of IV is therefore 64 bytes.

As is further illustrated in FIG. 3, after obtaining the input parameters for the encryption process, the auxiliary primes $p_1$, $p_2$, $q_1$ and $q_2$ are generated from the secret seed values $W_p$ and $W_q$ and the public randomization value IV (block 304). The potential key space for p and q is then divided into two equal intervals $I_1$ and $I_2$ (block 306). An initial start value is then generated for the search for p from $W_p$, $W_q$, $IV_p$, $IV_q$ (block 308). This initial start value $XX_p$ for p is then mapped into a user specific one of the $2^b$ segments of the first of the intervals $I_1$ utilizing a linear mapping function $G_{1,U}$ (block 310). The user specific one of the $2^b$ segments of $I_1$ into which the initial start value $XX_p$ is mapped is based on the user specific information such that the segments corresponding to different user specific information are disjoint. Furthermore, note that each of the $2^b$ segments contain cryptographic values having n bits. The user-dependent cryptographic value for p is then selected utilizing conventional RSA prime search procedures, however, the value for p is selected from the subspace selected by the user specific information utilizing the mapped initial start value to start the search for p (block 312).

After generation of the prime p, the prime q is generated. An initial start value is generated for the search for q from p, $W_q$, $IV_p$ and $IV_q$ (block 314). This initial start value $XX_q$ for q is then mapped into a user specific one of the $2^b$ segments of the second of the intervals $I_2$ utilizing a linear mapping function $G_{2,U}$ (block 316). The user specific one of the $2^b$ segments of $I_2$ into which the initial start value $XX_q$ is mapped is based on the user specific information such that the segments corresponding to different user specific information are disjoint. The user-dependent cryptographic value for q is then selected utilizing conventional RSA prime search procedures, however, the value for q is selected from the subspace selected by the user specific information utilizing the mapped initial start value to start the search for q (block (318).

Figure 4:
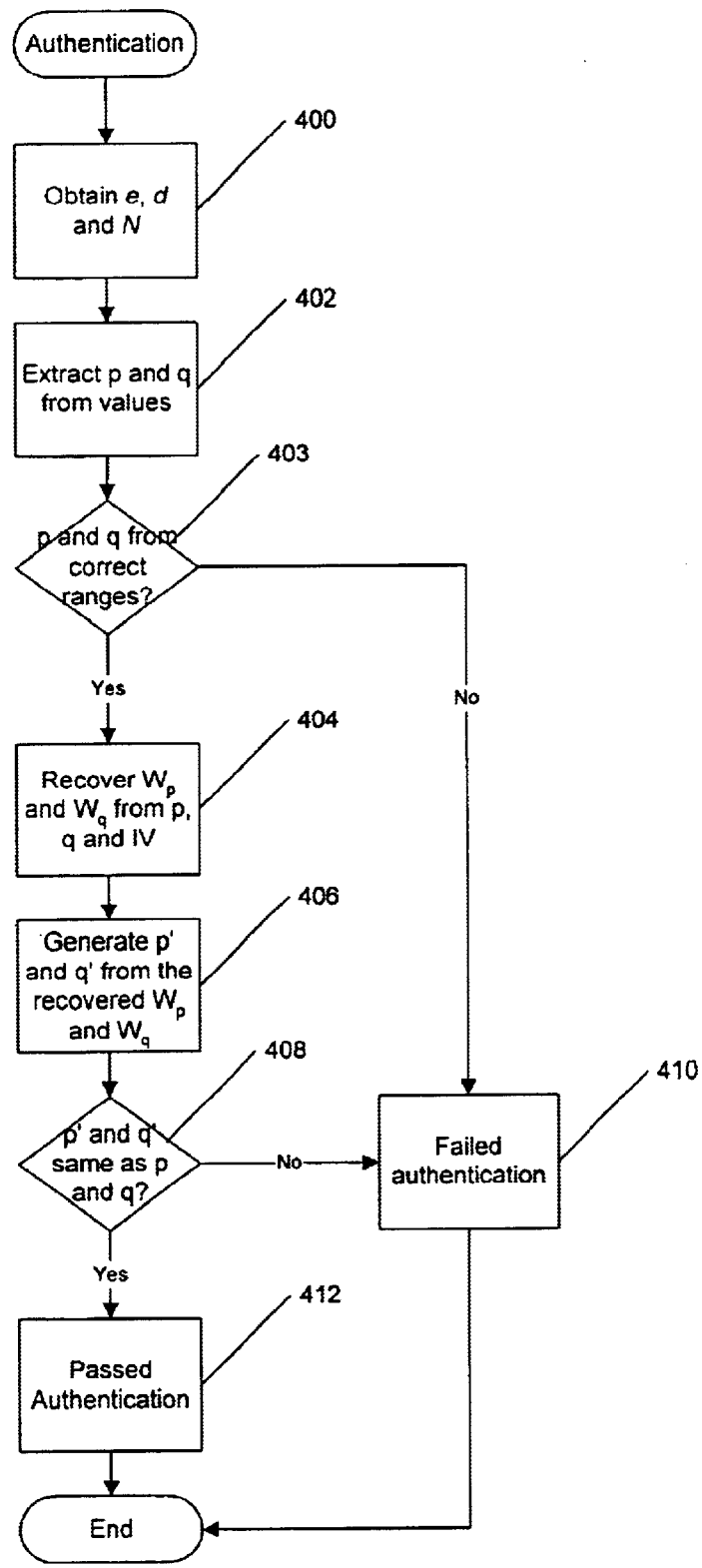
FIG. 4 is a flowchart illustrating authentication/auditing of an encrypted message according to one embodiment of the present invention.

Operations for authentication of crytpgraphic values generated utilizing the operations of FIG. 3 are illustrated in FIG. 4. As is seen in FIG. 4, the authentication of the encrypted values does not require the secret seed values $W_p$ and $W_q$ as inputs and, therefore, does not require storing of more secret information than is conventionally done in RSA operations. The prime number authentication procedure uses only the RSA private signature exponent d, which has to be stored to perform the RSA signature and/or encryption operations, and the readily-available public information: the user-specific parameter B, the RSA public modulus N and the public verification exponent e. Thus, the present invention provides for the ability to authenticate encrypted information without increasing the exposure to compromise of the encryption process by the storage of additional secret values.

Turning to the operations of FIG. 4, the public exponent e, private exponent d and the public modulus N are obtained (block 400) and p and q are extracted from this information (block 402). The recovery of p and q from this information may be accomplished by conventional techniques known to those of skill in the art. One such technique is described in Section 8.2.2 of A. Menezes, P. C. Van Oorschot, and S. Vanstone, *Handbook of Applied Cryptography*, CRC Press, 1997. The smaller of the two recovered values is a p value and the larger one is a q value. This assumption must made because of the relative relationship of p and q based on the relationship of the first and second intervals. As will be appreciated by those of skill in the art, this relationship may be reversed or otherwise modified however it must be predefined.

After recovering p and q from the encrypted information, it is determined if p and q are from the segments of the intervals $I_1$ and $I_2$ which correspond to the user specific information B (block 403). If p or q are not from the corresponding user specific segments, then they are not authentic and the authentication process fails (block 410). However, if p and q are from the proper segments, then $W_p$ and $W_q$ are recovered from p and q and IV (block 404). Having recovered $W_p$ and $W_q$, then the operations of FIG. 3 are performed to regenerate potential primes p' and q' (block 406). If p' and q' are equal to p and q (block 408) then the encrypted information is authentic and has passed authentication (block 412). If the values are not equal then the authentication process has failed (block 410).

Figure 5:
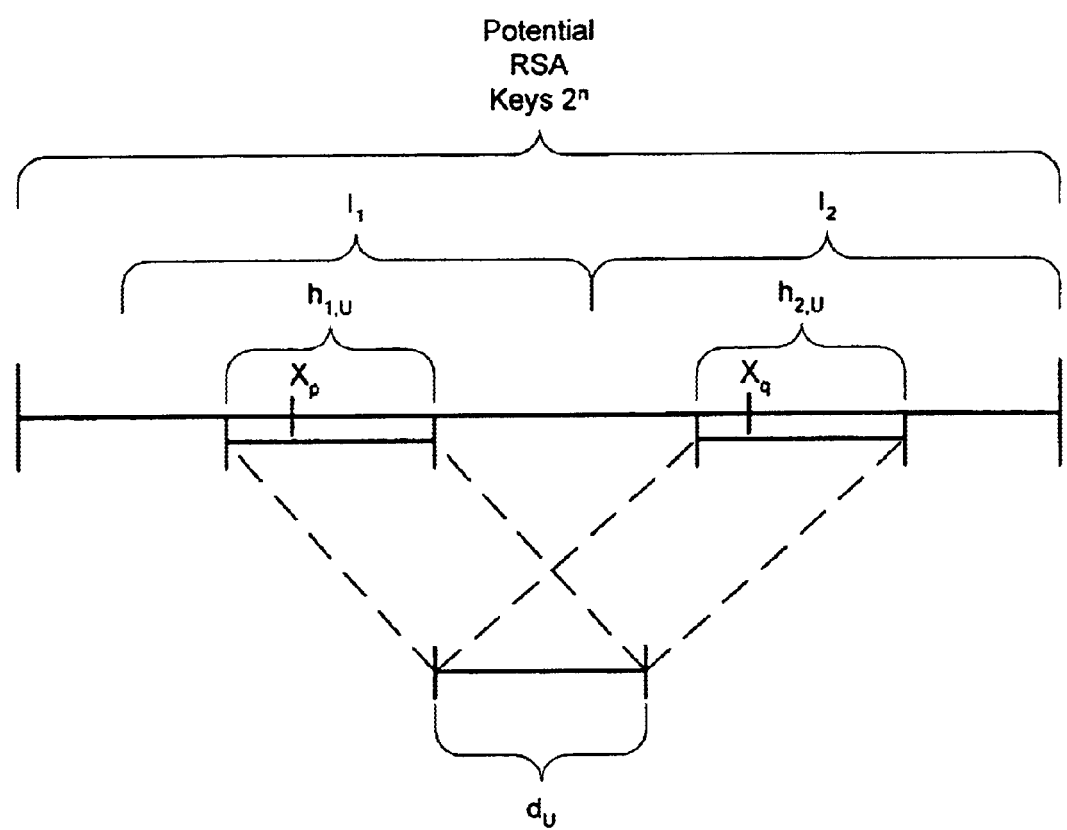
FIG. 5 is diagram illustrating the division of the key space and the assignment of user specific subspaces for an RSA encryption technique according to the present invention.
Figure 6:
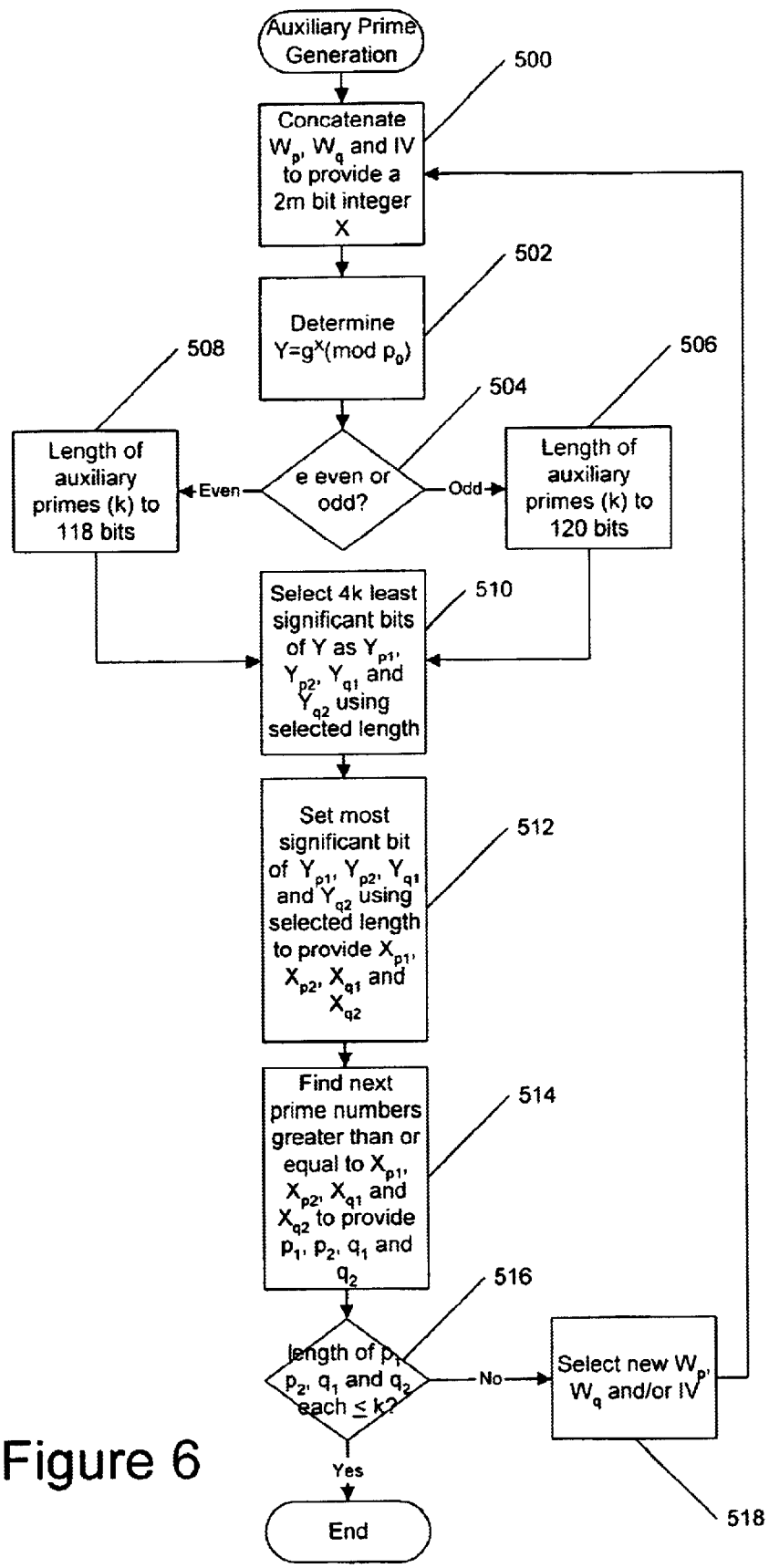
FIG. 6 is a flowchart illustrating operations according to one embodiment of the present invention for generating auxiliary prime values.
Figure 7:
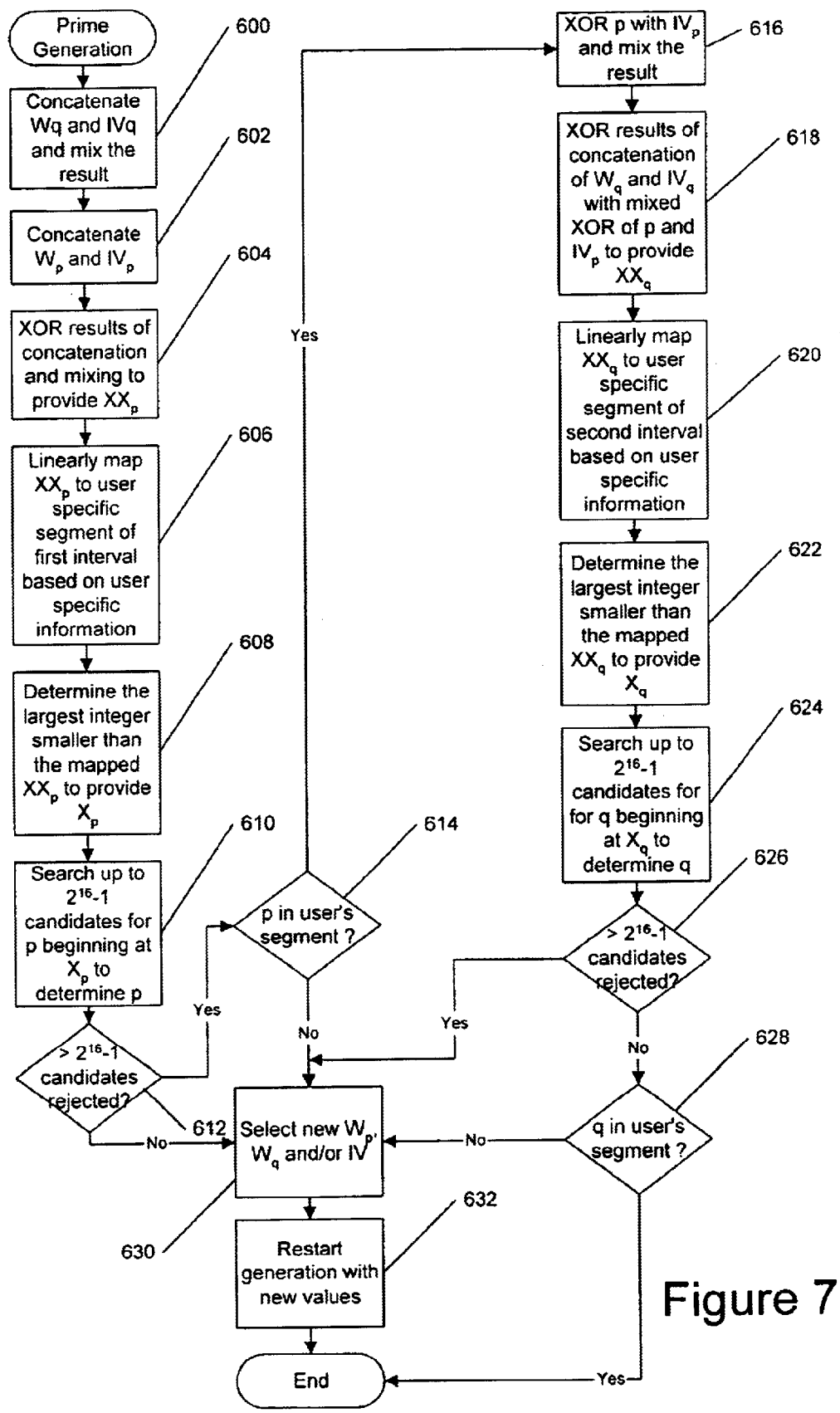
FIG. 7 is a flowchart illustrating operations according to one embodiment of the present invention for generating prime values p and q for use in RSA encryption.
Figure 8:
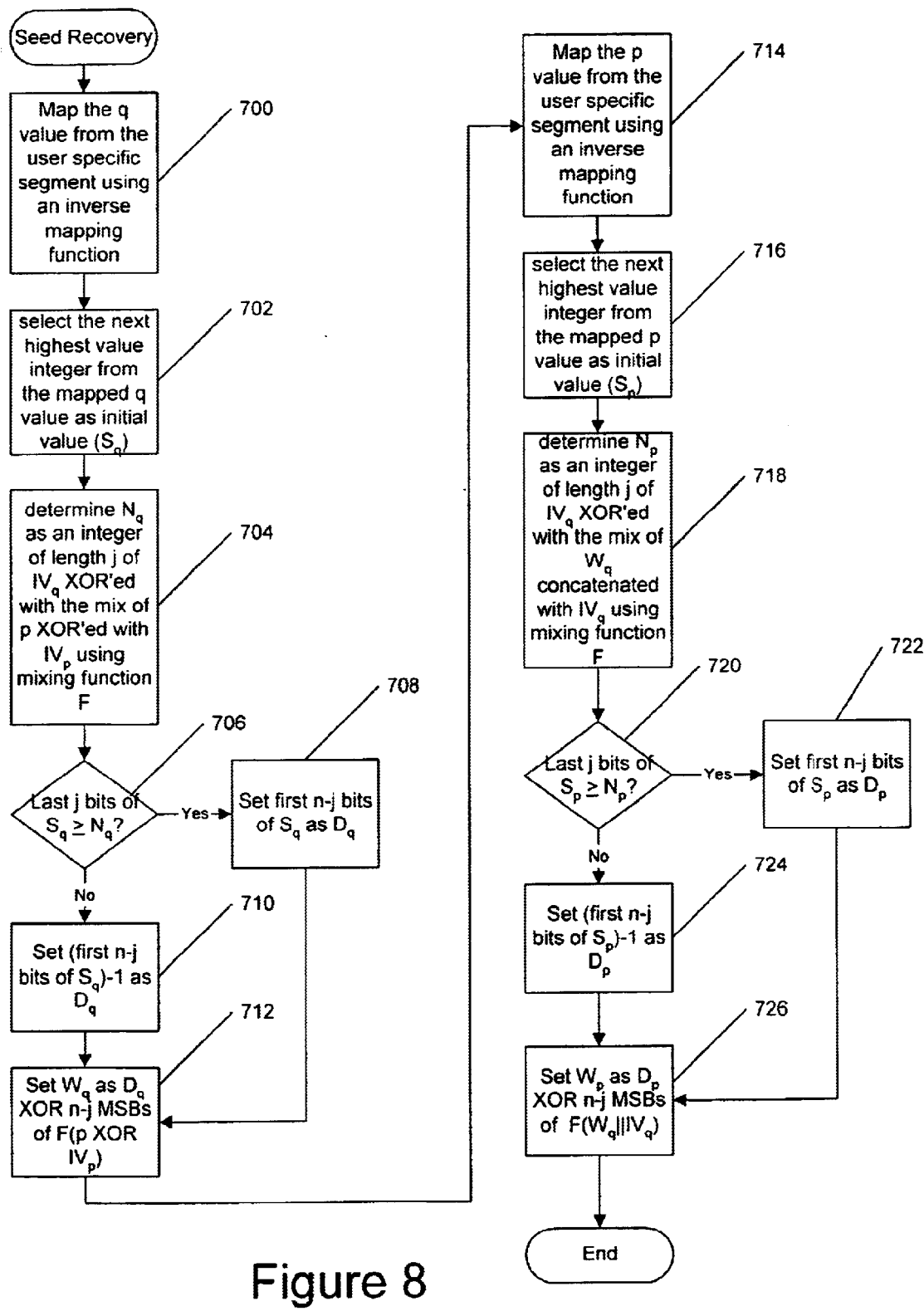
FIG. 8 is a flow chart illustration operations for recovering secret seed values from p and q values for an encoded message.

FIGS. 6 through 8 provide further details on specific aspects of the encryption and authentication processes illustrated in FIGS. 3 and 4 and will be described with reference to FIG. 5 which is an illustration of the mapping operations of the present invention to provide user-dependent RSA primes from the interval of potential primes for an n bit prime.

FIG. 6 illustrates in more details the operations of blocks 304 of FIG. 3. As seen in FIG. 6, operations for generating the auxiliary prime values are illustrated although there may be many ways to generate the auxiliary prime factors $p_1$, $p_2$, $q_1$ and $q_2$. The choice of a particular approach is not that critical since these primes will not be used in regeneration of random seeds during the authentication process. The method of generating $p_1$, $p_2$, $q_1$ and $q_2$ should, however, guarantee a reasonable level of secrecy and randomness among the numbers that it produces.

The auxiliary primes may be generated by concatenating $W_p$, $W_q$ and IV to provide a 2m bit integer X (block 500). As seen in block 502, the 2m bit integer is then used with a publicly known prime number $p_0$ whose length is at least n bits and a public generator g generate Y as $Y = g^x (\bmod p_0)$. The length of the auxiliary primes k is then determined based on whether e is even or odd (block 504). The length k is set to 120 bits if e is odd (block 506), or 118 bits if e is even (block 508). The 4k least significant bits of Y may then be selected such that $Y = ( \ldots \| Y_{p1} \| Y_{p2} \| Y_{q1} \| Y_{q2} )$ (block 510). The most significant bit in each of these values is set to "1" (block 512) with the resulting four values being designated $X_{p1}$, $X_{p2}$, $X_{q1}$ and $X_{q2}$, respectively. The prime number $p_1$ is the smallest prime greater than or equal to $X_{p1}$ (block 514). Values for $p_2$, $q_1$ and $q_2$ are similarly determined from $X_{p2}$, $X_{q1}$ and $X_{q2}$ (block 514). It is then determined if the length of any of $p_1$, $p_2$, $q_1$ or $q_2$ is greater than k (block 516). If so, then the process aborts and starts again with one or more new randomly generated seeds $W_p$, $W_q$, IV (block 518).

FIG. 7 illustrates in further detail the operations of blocks 308 through 318 of FIG. 3. The operations of FIG. 7 begins after the potential encryption value space has been divided in the two intervals $I_1$ and $I_2$ as illustrated in FIG. 5. As is seen in FIG. 5, the interval $I = [\sqrt{2}(2^{n-1}), 2^n]$ is divided into two intervals of equal lengths:

$$I_1 = [\sqrt{2}(2^{n-1}), 2^{n-} + 2^{n-3/2}] \text{ and } I_2 = [2^{n-1} + 2^{n-3/2}, 2^n].$$

For every user, the prime p will be selected from the interval $I_1$ and the prime q from the interval $I_2$ utilizing the operations illustrated in FIG. 7.

As is seen in FIG. 7, $W_q$ and $IV_q$ are concatenated and the concatenated value mixed (block 600) utilizing a public mixing function. For example, the 1 to 1 mixing function described in Matyas, M., Peyravian, M., Roginsky, A., and Zunic, N., "Reversible data mixing procedure for efficient public-key encryption," Computers & Security Vol. 17, No. 3, (265–272) 1998, which can be applied to any arbitrary n-bit input may be utilized. $W_p$ and $IV_p$ are also concatenated (block 602) and the results XORed with the results of the mixing (block 604) to provide the initial start point $XX_p$ in the interval $d_U$ illustrated in FIG. 5. Thus, $XX_p = (W_p \| IV_p) \oplus F(W_q \| IV_q)$ where F is the publicly known mixing function. If $XX_p$ is a 1 followed by m−1 zeroes, then the process aborts and starts again with the new $W_p$ and $W_q$ values.

$XX_p$ is then linearly mapped to a user specific segment of the first interval $I_1$ utilizing a linear mapping function based on the user specific information (block 608). This mapping is accomplished by the interval $I_1$ described above being divided into $2^b$ disjoint intervals equal in length. For user U with the user-specific parameter B, the corresponding interval will be $$h_{1,U} = \left[ A + \frac{B(C-A)}{2^b}, A + \frac{(B+1)(C-A)}{2^b} \right],$$

where A and C are the endpoints of interval $I_1$, i.e., $A = \sqrt{2}(2^{n-1})$ and $C = 2^{n-1} + 2^{n-3/2}$. The addition "B+1" is the bit addition (mod $2^b$). The length of $h_{1,U}$ is $$2^{n-b-1}\left(1 - \frac{1}{\sqrt{2}}\right),$$

which is approximately equal to $1.17 \times 2^{m-1}$.

Thus, a linear function $G_{1,U}$ may be defined that maps the $[2^{m-1}, 2^m)$ interval $d_U$ that contains all integers of binary length m into $h_{1,U}$. The precise formula for $G_{1,U}$ is as follows:

$$G_{1,U}(x) = 4\left(1 - \frac{1}{\sqrt{2}}\right)x + \sqrt{2}\,2^{n-1} + 4\left(1 - \frac{1}{\sqrt{2}}\right)(B-1)2^{m-1}.$$

The start point $X_p$ for the search for p may then be determined by taking the largest integer smaller than the mapped $XX_p$ value (block 608). In other words, $X_p = \lfloor G_{1,U}(XX_p) \rfloor$ where $\lceil y \rceil$ and $\lfloor y \rfloor$ are the ceiling and the floor of y, respectively, i.e., $\lceil 4.21 \rceil = 5$ and $\lfloor 4.2 \rfloor = 4$. A value for p is then generated by evaluating up to $2^{16} - 1 = 65,535$ candidates for p utilizing the starting point $X_p$ as the start for the search (block 610). If more than $2^{16} - 1 = 65,535$ candidates were rejected in selecting p (block 614), then the process aborts and starts again with one or more new randomly generated seeds $W_p$, $W_q$, IV (blocks 630 and 632). As described below, this limitation on the number of candidates which may be rejected in arriving at p, places bounds on the distance in the segment $h_{1,U}$ that p may be from $X_p$ which facilitates the recover of $W_p$ from p. If a p value was selected, it is then determined if the selected p is within the segment $h_{1,U}$ associated with the user specific information (block 614). If p is not within the segment $h_{1,U}$, then the process aborts and starts again with one or more new randomly generated seeds $W_p$, $W_q$, IV (blocks 630 and 632).

Having established a value for p, the generation of a value for q begins by XORing p with $IV_p$ and then utilizing the public mixing function F to mix the result (block 616). The concatenation of $W_q$ and $IV_q$ is then XORed with the results of the mixing (block 618) to provide the initial start point $XX_q$ in the interval $d_U$ illustrated in FIG. 5. Thus, $XX_q = (W_q \| IV_q) \oplus F(p \oplus IV_p)$ where F is the publicly known mixing function. Furthermore, the XOR of two numbers that might be of a different length means that both numbers are right-justified and the XOR is taken of the least significant bits while the most significant bits are taken directly from the longer number. If $XX_q$ is a 1 followed by m−1 zeroes, then the process aborts and starts again with the new $W_p$ and $W_q$ values.

$XX_q$ is then linearly mapped to a user specific segment of the first interval $I_2$ utilizing a linear mapping function based on the user specific information (block 620). This mapping maybe accomplished by the interval $I_2$ described above being divided into $2^b$ disjoint intervals equal in length. For user U with the user-specific parameter B, the corresponding interval will be $$h_{2,U} = \left[ A + \frac{B(C-A)}{2^b}, A + \frac{(B+1)(C-A)}{2^b} \right],$$

where A and C are the endpoints of interval $I_2$, i.e., $A = 2^{n-1} + 2^{n-3/2}$ and $C = 2^n$. The length of $h_{2,U}$ is the same as that of $h_{1,U}$.

Thus, a linear function $G_{2,U}$ may be defined that maps the $[2^{m-1}, 2^m)$ interval $d_U$ that contains all integers of binary length m into $h_{2,U}$. The precise formula for $G_{2,U}$ is as follows:

$$G_{2,U}(x) = 4\left(1 - \frac{1}{\sqrt{2}}\right)x + 2^{n-1} + 2^{n-3/2} + 4\left(1 - \frac{1}{\sqrt{2}}\right)(B-1)2^{m-1}.$$

The start point $X_q$ for the search for q may then be determined by taking the largest integer smaller than the mapped $XX_q$ value (block 622). In other words, $X_q = \lfloor G_{2,U}(XX_q) \rfloor$. A value for q is then selected based utilizing the starting point $X_q$ and evaluating up to $2^{16} - 1 = 65,535$ candidates for q (block 624). If more than $2^{16} - 1 = 65,535$ candidates were rejected in selecting q (block 626), then the process aborts and starts again with one or more new randomly generated seeds $W_p$, $W_q$, IV (blocks 630 and 632). If less than 65,535, candidates were rejected in selecting q, then it is determined if the selected q is within the segment $h_{2,U}$ associated with the user specific information (block 628). If q is not within the segment $h_{2,U}$, then the process aborts and starts again with one or more new randomly generated seeds $W_p$, $W_q$, IV (blocks 630 and 632). If q is within the segment $h_{2,U}$, then the process of generating p and q is complete. The above described prime generation operations provides primes which automatically satisfy the condition $|p-q| \leq 2^{n-100}$ as required in the ANSI standard through the selection of the intervals $I_1$ and $I_2$.

Thus, the present invention can provide RSA primes which are based on user specific information. These primes may then be further used to generate user-dependent RSA key values. Furthermore, because the intervals $d_U$ for users are disjoint, the resulting RSA primes will also be disjoint. By making the prime generation process dependent on user-specific data, such as a userID or biometric data, one has the ability to later prove that a generated prime and/or key belongs to a particular user. In this regard, the present invention can provide a means to "brand" a key or prime so that its rightful user can be determined. This branding feature may ensure that a user can prove that a key or prime is one belonging to, or generated in, their designated space of keys or primes and that a user cannot deny that a key or prime is one belonging to, or generated in, their designated space of keys or primes.

The operations of block 404 of FIG. 4 for the recovery of the seed values $W_p$ and $W_q$ will now be described in further detail with reference to FIG. 8. As is seen in FIG. 8, recovery begins by inverse mapping the q value from the user specific segment to the interval $d_U$ (block 700). The next highest integer value from the mapped value is then selected as an initial value $S_q$ (block 702). Thus, Sq may be expressed as $S_q=\lceil y \rceil$, where $y=G_{2,U}^{-1}(q)$. $S_q$ may be represented as $D_q'\|E_q$, where the length of $E_q$ is j (i.e. 256) bits and the length of $D_q'$ is n-j (i.e. n-256) bits. From the definition of $XX_q$, $XX_q$ may be represented as $M_q\|N_q$, where $M_q$ is an unknown (at this stage of the prime recovery) quantity and $N_q$ is a known j (i.e. 256-bit-long) string equal to $IV_q \oplus F(p \oplus IV_p)$. $N_q$ is determined by XORing $IV_q$ with the mix of p XORed with $IV_p$ to provide a value of j bits in length (block 704).

Then, it is determined if the least significant j bits of $S_q$ (i.e. $E_q$) are greater than or equal to $N_q$ (block 706). If $E_q \geq N_q$ then the first n-j bits of $S_q$ are used as $D_q$ (i.e. $D_q = D_q'$) (block 708). If the least significant j bits of $S_q$ are less than $N_q$ (block 706) then 1 is subtracted from value corresponding to the first n-j bits of $S_q$ and this value used as $D_q$ (i.e. $D_q = D_q'-1$) (block 710). This value of $D_q$ is the same as the n-j most significant bits of $XX_q$. $W_q$ is then recovered by determining $W_q = D_q \oplus$(the n-j (i.e. 256) most significant bits of $F(p \oplus IV_p)$) (block 712).

To establish that the above procedure leads to the correct value of $W_q$, it is first noted that $0 \leq XX_q - G_{2,U}^{-1}(X_q) < 1$, therefore $XX_q = \lceil y \rceil$, where $y = G_{2,U}^{-1}(X_q)$. Now, $0 \leq \lceil G_{2,U}^{-1}(q) \rceil - \lceil G_{2,U}^{-1}(X_q) \rceil < G_{2,U}^{-1}(q) - G_{2,U}^{-1}(X_q) + 1 =$ $$\frac{1}{4\left(1-\frac{1}{\sqrt{2}}\right)}(q-X_q)+1 < 1^{256}.$$

Hence $0 \leq S_q - XX_q < 2^{256}$. This justifies the establishing of $D_q$ as either $D_q'$ or $D_q'-1$. This determination is based on the fact that $q-X_q < 2^{256}$ This inequality holds since q is obtained by taking no more than $2^{16}-1$ steps of size $q_1 q_2$ or $8q_1 q_2$ up from a number that is smaller than $X_q + 2^{240}$ as described above. The steps are shorter than $2^{240}$ by our choice of $q_1$ and $q_2$.

Having established a value for $W_q$, the p value is then inverse mapped from the user specific segment to the interval $d_U$ (block 714). The next highest integer value from the mapped value is then selected as an initial value $S_p$ (block 716). Thus, $S_p$ may be expressed as $S_p = \lceil y \rceil$, where $y = G_{1,U}^{-1}(p)$. $S_p$ may be represented as $D_p'\|E_p$, where the length of $E_p$ is j (i.e. 256) bits and the length of $D_p'$ is n-j (i.e. n-256) bits. From the definition of $XX_p$, $XX_p$ may be represented as $M_p\|N_p$, where $M_p$ is an unknown (at this stage of the prime recovery) quantity and $N_p$ is a known j (i.e. 256-bit-long) string equal to $IV_p \oplus F(W_q\|IV_q)$. Thus, after inverse mapping p and taking the ceiling, $N_p$ is determined by XORing $IV_p$ with the mix of $W_q$ concatenated with $IV_q$ to provide a value of j bits in length (block 718).

Then, it is determined if the least significant j bits of $S_p$ (i.e. $E_p$) are greater than or equal to $N_p$ (block 720). If $E_p \geq N_p$ then the first n-j bits of $S_p$ are used as $D_p$ (i.e. $D_p = D_p'$) (block 708). If the least significant j bits of $S_p$ are less than $N_p$ (block 706) then 1 is subtracted from the first n-j bits of $S_p$ and this value used as $D_p$ (i.e. $D_p = D_p'-1$) (block 724). This value of $D_p$ is the same as the n-j most significant bits of $XX_p$. $W_p$ is then recovered by determining $W_p \oplus$(the n-j (i.e. 256) most significant bits of $F(W_q\|IV_q)$) (block 726).

To establish that the above procedure leads to the correct value of $W_p$, it is first noted that $0 \leq XX_p - G_{1,U}^{-1}(X_p) < 1$, therefore $XX_p = \lceil y \rceil$, where $y = G_{1,U}^{-1}(X_p)$. Now, $0 \leq \lceil G_{1,U}^{-1}(p) \rceil - \lceil G_{1,U}^{-1}(X_p) \rceil < G_{1,U}^{-1}(p) - G_{1,U}^{-1}(X_p) + 1 =$ $$\frac{1}{4\left(1-\frac{1}{\sqrt{2}}\right)}(p-X_p)+1 < 1^{256}.$$

Hence $0 \leq S_p - XX_p < 2^{256}$. This inequality holds since p is obtained by taking no more than $2^{16}-1$ steps of size $p_1 p_2$ or $8 p_1 p_2$ up from a number that is smaller than $X_p + 2^{240}$ as described above. The steps are shorter than $2^{240}$ by our choice of $p_1$ and $p_2$. The final determination of $W_p$ may then be directly determined from the definition of $XX_p$.

The present invention has also been described with reference to the use of user specific information. User specific information could be a userID or, biometric information or a combination of the two. In this regard, the present invention provides a means to "brand" a key, prime or other cryptographic value so that its rightful user can be determined. Those skilled in the art will recognize that such branding is not limited to only users, but could be used to brand a key, prime or other cryptographic value with information specific to and associated with an entity where the entity is other than a human user (i.e. entity specific information). For example, the user specific information could be used to brand information with a company identifier (companyID), thus enabling one to show that the branded value belongs to a specific company. Whereas a biometric is associated with a specific user, an identifier could be associated with a user, group, organization, company, etc., and therefore the present invention is not limited to a method of branding based only on user specific information. Thus, as used herein the term user specific information also refers to entity specific information. A human user is just an example of one type of entity.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of generating RSA cryptographic values, the method comprising the steps of:

obtaining entity specific information (B) about a user;

obtaining a first secret seed value ($W_p$) and a second secret seed value ($W_q$);

obtaining a third, publicly known, randomization value (IV) having a first portion ($IV_p$) and a second portion ($IV_q$);

dividing a potential range of RSA encryption values into a first interval and a second interval;

generating a first initial value ($XX_p$) based on the first secret seed value ($W_p$), the second secret seed value ($W_q$) and the first portion of the third randomization value ($IV_p$);

mapping the first initial value to an entity specific segment of the first interval utilizing the obtained entity specific information (B) to provide a mapped first initial value ($X_p$);

selecting a first user dependent RSA cryptographic value (p) from the entity specific segment of the first interval utilizing the mapped first initial value as a starting point for a search for the first user dependent RSA cryptographic value;

generating a second initial value ($XX_q$) based on the first user dependent RSA cryptographic value (p), the second secret seed value ($W_q$) and the first portion of the third randomization value ($IV_q$);

mapping the second initial value to an entity specific segment of the second interval utilizing the obtained entity specific information to provide a mapped second initial value ($X_q$);

selecting a second user dependent RSA cryptographic value (q) from the entity specific segment of the second interval utilizing the mapped second initial value as a starting point for a search for the second user dependent RSA cryptographic value; and generating an RSA cryptographic key value for use in encrypting data utilizing the first and second user dependent RSA cryptographic values p and q.

2. A method according to claim 1, further comprising the step of generating auxiliary prime divisors corresponding to the first user dependent RSA cryptographic value (p) and the second user dependent RSA cryptographic value (q).

3. A method according to claim 2, wherein the auxiliary prime divisors are generated based upon the first secret seed value ($W_p$), the second secret seed value ($W_q$) and the third randomization value (IV).

4. A method according to claim 3, wherein $p_0$ is a publicly known prime number whose length is at least n bits and g is a public generator, and wherein the step of generating auxiliary prime divisors comprises the steps of:

concatenating the first secret seed value ($W_p$), the second secret seed value ($W_q$) and the third randomization value (IV) so as to provide an exponent value (X);

determining an initial random value by determining $Y=g^X \pmod{p_0}$;

selecting initial prime search values from the initial random value;

setting the most significant bit of the initial prime search values to "1" to provide final prime search values; and selecting as the prime divisors the smallest prime value greater than or equal to the final prime search values.

5. A method according to claim 4, further comprising the steps of:

selecting at least one of a new first secret seed value ($W_p$), a new second secret seed value ($W_q$) and a new third randomization value (IV) if the length of at least one of the prime divisors is greater than the length of the final prime search values; and re-generating the prime divisors if the length of at least one of the prime divisors is greater than the length of the final prime search values.

6. A method according to claim 4, wherein the initial prime search values have a first length if a public encryption exponent (e) has an odd value and a second length of the public encryption exponent (e) has an even value.

7. A method according to claim 5, wherein the first length is 120 bits and the second length is 118 bits.

8. A method according to claim 1, wherein the entity specific segments comprise the segments $[A+(B(C-A))/2^b, A+((B+1)(C-A))/2^b]$ wherein A and C are the endpoints of the respective intervals and the entity specific information comprises b bits.

9. A method according to claim 8, wherein the RSA cryptographic values comprise n bits and wherein the first interval comprises RSA cryptographic values from the set of $[\sqrt{2}(2^{n-1}), 2^n + 2^{n-3/2}]$ and the second interval comprises RSA cryptographic values from the set of $[2^{n-1}+2^{n-3/2}, 2^n]$.

10. A method according to claim 9, wherein the binary size of the RSA cryptographic values are 2n, a size m is n−b−2 and wherein the step of mapping the first initial value comprises the steps of:

linearly mapping the first initial value to a entity specific segment of the first interval utilizing the obtained entity specific information (B) utilizing the linear mapping function $$G_{1,U}(x) = 4\left(1 - \frac{1}{\sqrt{2}}\right)x + \sqrt{2}\,2^{n-1} + 4\left(1 - \frac{1}{\sqrt{2}}\right)(B-1)2^{m-1}; \text{ and}$$

selecting as the mapped first initial value ($X_p$) the integer value which is not greater than the first initial value ($XX_p$) mapped utilizing the mapping function $G_{1,U}$; and wherein the step of mapping the second initial value comprises the step of linearly mapping the second initial value to a entity specific segment of the second interval utilizing the obtained entity specific information (B) utilizing the linear mapping function; and selecting as the mapped second initial value ($X_q$) the integer value which is not greater than the second initial value ($XX_q$) mapped utilizing the mapping function $G_{2,U}$.

11. A method according to claim 1, wherein the entity specific information is biometric information.

12. A method according to claim 1, wherein the entity specific information is a globally unique user identification.

13. A method according to claim 1, further comprising the steps of:

determining if a candidate for p is considered outside the range of RSA cryptographic values in the entity specific segment of the first interval;

selecting at least one of a new first secret seed value ($W_p$), a new second secret seed value ($W_q$) and a new third randomization value (IV) if a candidate for p is considered outside the range of RSA cryptographic values in the entity specific segment of the first interval;

determining if a candidate for q is considered outside the range of RSA cryptographic values in the entity specific segment of the second interval;

selecting at least one of a new first secret seed value ($W_p$), a new second secret seed value ($W_q$) and a new third randomization value (IV) if a candidate for q is considered outside the range of RSA cryptographic values in the entity specific segment of the second interval; and restarting the cryptographic value generation utilizing the first and second secret seed values and third randomization value if either a candidate for p is considered outside the range of RSA cryptographic values in the entity specific segment of the first interval or if a candidate for q is considered outside the range of RSA cryptographic values in the entity specific segment of the second interval.

14. A method according to claim 1 further comprising the steps of: determining if $2^{16}-1$ candidates for p have been rejected in selecting the first user dependent RSA cryptographic value;

selecting at least one of a new first secret seed value ($W_p$), a new second secret seed value ($W_q$) and a new third randomization value (IV) if $2^{16}-1$ candidates for p have been rejected in selecting the first user dependent RSA cryptographic value;

determining if $2^{16-1}$ candidates for q have been rejected in selecting the second user dependent RSA cryptographic value;

selecting at least one of a new first secret seed value ($W_p$), a new second secret seed value ($W_q$) and a new third randomization value (IV) if $2^{16-1}$ candidates for q have been rejected in selecting the second user dependent RSA cryptographic value; and restarting the cryptographic generation utilizing the first and second secret seed values and third randomization value if either $2^{16-1}$ candidates for p have been rejected in selecting the first user dependent RSA cryptographic value or if $2^{16-1}$ candidates for q have been rejected in selecting the second user dependent RSA cryptographic value.

15. A method according to claim 1, wherein the step of generating a first initial value comprises the steps of:

mixing a concatenation of $W_q$ and $IV_q$ utilizing a publicly known mixing function;

concatenating $W_p$ and $IV_p$; and

EXCLUSIVE-ORing the mixed concatenation of $W_q$ and $IV_q$ and the concatenation $W_p$ and $IV_p$ to provide the first initial value ($XX_p$); and wherein the step of generating a second initial value comprises the steps of:

EXCLUSIVE ORing p and $IV_p$;

mixing the EXCLUSIVE OR of p and $IV_p$ utilizing the publicly known mixing function;

concatenating $W_q$ and $IV_q$; and

EXCLUSIVE-ORing the mixed EXCLUSIVE OR of p and $IV_p$ and the concatenation of $W_q$ and $IV_q$ to provide the second initial value ($XX_q$).

16. A method according to claim 1, further comprising the step of authenticating generated candidate RSA cryptographic values.

17. A method of authenticating an RSA cryptographic value comprising the steps of:

recovering two candidate prime values utilizing a RSA public modulus (N) and a private signature exponent (d);

establishing a first of two prime values as a first candidate cryptographic value (p') and the second of the two prime values as a second candidate cryptographic value (q');

recovering first and second candidate seed values $W_p'$ and $W_q'$ from the first and second candidate cryptographic values p' and q' and from the third publicly known seed value IV;

generating first and second RSA cryptographic values p" and q" utilizing $W_p'$ and $W_q'$ and IV; and comparing p' and p" and q' and q" to authenticate the RSA cryptographic values.

18. A method according to claim 17, further comprising the step of determining that the RSA cryptographic values are not authentic if p' and q' are values outside the user defined segments of the first and second intervals.

19. A method according to claim 17, wherein the first of the two prime numbers is a smaller of the two prime numbers.

20. A method according to claim 17, wherein the step of recovering first and second candidate seed values $W_p'$ and $W_q'$ from the first and second candidate cryptographic values p' and q' and from the third publicly known seed value IV comprises the steps of:

inverse mapping the second candidate value q' to provide a first initial value $S_q$;

EXCLUSIVE ORing the first candidate cryptographic value p' and $IV_p$;

mixing the EXCLUSIVE OR of the first candidate cryptographic value p' and $IV_p$ with the publicly known mixing function;

EXCLUSIVE ORing the mixed EXCLUSIVE OR of the first candidate cryptographic value p' and $IV_p$ with $IV_q$ to provide a first known value ($N_q$) having a length (j);

determining if a value corresponding to the j least significant bits of $S_q$ is less than the first known value $N_q$;

EXCLUSIVE ORing the n−j most significant bits of the mixed concatenation of the first candidate cryptographic value p' and $IV_p$ with the n−j most significant bits of $S_q$ if the value corresponding to the j least significant bits of the first subsequent value is not less than the first known value $N_q$, to provide the second candidate seed value;

EXCLUSIVE-ORing the n−j most significant bits of the mixed concatenation of the first candidate cryptographic value p' and $IV_p$ with 1 subtracted from the value corresponding to the n−j most significant bits of $S_q$ if the value corresponding to the j least significant bits of the first subsequent value is less than the first known value $N_q$, to provide the second candidate seed value;

inverse mapping the first candidate value p' to provide a second initial value $S_p$;

concatenating the second candidate seed value and $IV_q$;

mixing the concatenation of the second candidate seed value and $IV_q$ with the publicly known mixing function;

EXCLUSIVE ORing the mixed concatenation of the second candidate seed value and $IV_q$ with $IV_p$ to provide a second known value $N_p$ having a length (j);

determining if a value corresponding to the j least significant bits of $S_p$ is less than the second known value $N_p$;

EXCLUSIVE ORing the n−j most significant bits of the mixed concatentation of the second candidate seed value and $IV_q$ with the n−j most significant bits of $S_p$ if value corresponding to the j least significant bits of the second subsequent value is not less than the second known value $N_p$, to provide the first candidate seed value;

EXCLUSIVE ORing the n−j most significant bits of the mixed concatenation of the second candidate seed value and $IV_q$ with 1 subtracted from the value corresponding to the n−j most significant bits of $S_p$ if the value corresponding to the j least significant bits of the second subsequent value is less than the second known value $N_p$, to provide the first candidate seed value.

21. A method according to claim 20, wherein j is 256 bits.

22. A system for generating an RSA cryptographic, utilizing entity specific information (B) about a user, a first secret seed value ($W_p$) and a second secret seed value ($W_q$), and a third, publicly known, randomization value (IV) having a first portion ($IV_p$) and a second portion ($IV_q$), comprising:

means for dividing a potential range of RSA encryption values into a first interval and a second interval;

means for generating a first initial value ($XX_p$) based on the first secret seed value ($W_p$), the second secret seed value ($W_q$) and the first portion of the third randomization value ($IV_p$);

means for mapping the first initial value to an entity specific segment of the first interval utilizing the obtained entity specific information (B) to provide a mapped first initial value ($X_p$);

means for selecting a first user dependent RSA cryptographic value (p) from the entity specific segment of the first interval utilizing the mapped first initial value as a starting point for a search for the first user dependent RSA cryptographic value;

means for generating a second initial value ($XX_q$) based on the first user dependent RSA cryptographic value (p), the second secret seed value ($W_q$) and the first portion of the third randomization value ($IV_q$);

means for mapping the second initial value to an entity specific segment of the second interval utilizing the obtained entity specific information to provide a mapped second initial value ($X_q$);

means for selecting a second user dependent RSA cryptographic value (q) from the entity specific segment of the second interval utilizing the mapped second initial value as a starting point for a search for the second user dependent RSA cryptographic value; and means for generating an RSA cryptographic key value for use in encrypting data utilizing the first and second user dependent RSA cryptographic values p and q.

23. A system according to claim 22, further comprising means for authenticating generated candidate RSA cryptographic values.

24. A system for authenticating a message, comprising:

means for recovering two candidate prime values utilizing a RSA public modulus (n) and a private signature exponent (d) of the encrypted message;

means for establishing a first of two prime values as a first candidate cryptographic value (p') and the second of the two prime values as a second candidate cryptographic value (q');

means for recovering first and second candidate seed values $W_p'$ and $W_q'$ from the first and second candidate cryptographic values p' and q' and from the third publicly known seed value IV;

means for generating first and second RSA cryptographic values p" and q" utilizing $W_p'$ and $W_q'$ and IV; and means for comparing p' and p" and q' and q" to authenticate the message.

25. A computer program product for generating an RSA cryptographic value, utilizing entity specific information (B) about a user, a first secret seed value ($W_p$) and a second secret seed value ($W_q$), and a third, publicly known, randomization value (IV) having a first portion ($IV_p$) and a second portion ($IV_q$), comprising:

a computer readable storage medium having computer readable program code embodied in said medium, said computer readable program code comprising:

computer readable code which divides a potential range of RSA encryption values into a first interval and a second interval;

computer readable code which generates a first initial value ($XX_p$) based on the first secret seed value ($W_p$), the second secret seed value ($W_q$) and the first portion of the third randomization value ($IV_p$);

computer readable code which maps the first initial value to an entity specific segment of the first interval utilizing the obtained entity specific information (B) to provide a mapped first initial value ($X_p$);

computer readable code which selects a first user dependent RSA cryptographic value (p) from the entity specific segment of the first interval utilizing the mapped first initial value as a starting point for a search for the first user dependent RSA cryptographic value;

computer readable code which generates a second initial value ($XX_q$) based on the first user dependent RSA cryptographic value (p), the second secret seed value ($W_q$) and the first portion of the third randomization value ($IV_q$);

computer readable code which maps the second initial value to an entity specific segment of the second interval utilizing the obtained entity specific information to provide a mapped second initial value ($X_q$); and computer readable code which selects a second user dependent RSA cryptographic value (q) from the entity specific segment of the second interval utilizing the mapped second initial value as a starting point for a search for the second user dependent RSA cryptographic value.

26. A computer program product according to claim 25, further comprising computer readable code which authenticates generated candidate RSA cryptographic values.

27. A computer program product for authenticating an RSA cryptographic value, comprising:

a computer readable storage medium having computer readable program code embodied in said medium, said computer readable program code comprising:

computer readable code which recovers two candidate prime values utilizing a RSA public modulus (n) and a private signature exponent (d) of the encrypted message;

computer readable code which establishes a first of the two prime values as a first candidate cryptographic value (p') and the second of the two prime values as a second candidate cryptographic value (q');

computer readable code which recovers first and second candidate seed values $W_p'$ and $W_q'$ from the first and second candidate cryptographic values p' and q' and from the third publicly known seed value IV;

computer readable code which generates first and second RSA cryptographic values p" and q" utilizing $W_p'$ and $W_q'$ and IV; and computer readable code which compares p' and p" and q' and q" to authenticate the message.

28. A system according to claim 22, further comprising means for generating auxiliary prime divisors corresponding to the first user dependent RSA cryptographic value (p) and the second user dependent RSA cryptographic value (q).

29. A system according to claim 28, wherein the auxiliary prime divisors are generated based upon the first secret seed value ($W_p$), the second secret seed value ($W_q$) and the third randomization value (IV).

30. A method according to claim 29, wherein $p_0$ is a publicly known prime number whose length is at least n bits and g is a public generator, and wherein the means for generating auxiliary prime divisors comprises:

means for concatenating the first secret seed value ($W_p$), the second secret seed value ($W_q$) and the third randomization value (IV) so as to provide an exponent value (X);

means for determining an initial random value by determining $Y = g^X (\bmod p_0)$;

means for selecting initial prime search values from the initial random value;
means for setting the most significant bit of the initial prime search values to "1" to provide final prime search values; and
means for selecting as the prime divisors the smallest prime value greater than or equal to the final prime search values.

31. A system according to claim 30, further comprising:
means for selecting at least one of a new first secret seed value ($W_p$), a new second secret seed value ($W_q$) and a new third randomization value (IV) if the length of at least one of the prime divisors is greater than the length of the final prime search values; and
means for re-generating the prime divisors if the length of at least one of the prime divisors is greater than the length of the final prime search values.

32. A system according to claim 30, wherein the initial prime search values have a first length if a public encryption exponent (e) has an odd value and a second length of the public encryption exponent (e) has an even value.

33. A system according to claim 31, wherein the first length is 120 bits and the second length is 118 bits.

34. A system according to claim 22, wherein the entity specific segments comprise the segments $[A+(B(C-A))/2^b, A+((B+1)(C-A))/2^b]$ wherein A and C are the endpoints of the respective intervals and the entity specific information comprises b bits.

35. A method according to claim 34, wherein the RSA cryptographic values comprise n bits and wherein the first interval comprises RSA cryptographic values from the set of $[\sqrt{2}(2^{n-1}), 2^{n-}+2^{n-3/2}]$ and the second interval comprises RSA cryptographic values from the set of $[2^{n-1}+2^{n-3/2}, 2^n]$.

36. A system according to claim 35, wherein the binary size of the RSA cryptographic values are 2n, a size m is n−b−2 and wherein the means for mapping the first initial value comprises:
means for linearly mapping the first initial value to a entity specific segment of the first interval utilizing the obtained entity specific information (B) utilizing the linear mapping function $$G_{1,U}(x) = 4\left(1 - \frac{1}{\sqrt{2}}\right)x + \sqrt{2}\,2^{n-1} + 4\left(1 - \frac{1}{\sqrt{2}}\right)(B-1)2^{m-1}; \text{ and}$$

means for selecting as the mapped first initial value ($X_p$) the integer value which is not greater than the first initial value ($XX_p$) mapped utilizing the mapping function $G_{1,U}$; and
wherein the means for mapping the second initial value comprises means for linearly mapping the second initial value to a entity specific segment of the second interval utilizing the obtained entity specific information (B) utilizing the linear mapping function $$G_{2,U}(x) = 4\left(1 - \frac{1}{\sqrt{2}}\right)x + 2^{n-1} + 2^{n-3/2} + 4\left(1 - \frac{1}{\sqrt{2}}\right)(B-1)2^{m-1}; \text{ and}$$

means for selecting as the mapped second initial value ($X_q$) the integer value which is not greater than the second initial value ($XX_q$) mapped utilizing the mapping function $G_{2,U}$.

37. A system according to claim 22, further comprising:
means for determining if a candidate for p is considered outside the range of RSA cryptographic values in the entity specific segment of the first interval;
means for selecting at least one of a new first secret seed value ($W_p$), a new second secret seed value ($W_q$) and a new third randomization value (IV) if a candidate for p is considered outside the range of RSA cryptographic values in the entity specific segment of the first interval;
means for determining if a candidate for q is considered outside the range of RSA cryptographic values in the entity specific segment of the second interval;
means for selecting at least one of a new first secret seed value ($W_p$), a new second secret seed value ($W_q$) and a new third randomization value (IV) if a candidate for q is considered outside the range of RSA cryptographic values in the entity specific segment of the second interval; and
means for restarting the cryptographic value generation utilizing the first and second secret seed values and third randomization value if either a candidate for p is considered outside the range of RSA cryptographic values in the entity specific segment of the first interval or if a candidate for q is considered outside the range of RSA cryptographic values in the entity specific segment of the second interval.

38. A system according to claim 22 further comprising:
means for determining if $2^{16}-1$ candidates for p have been rejected in selecting the first user dependent RSA cryptographic value;
means for selecting at least one of a new first secret seed value ($W_p$), a new second secret seed value ($W_q$) and a new third randomization value (IV) if $2^{16}-1$ candidates for p have been rejected in selecting the first user dependent RSA cryptographic value;
means for determining if $2^{16}-1$ candidates for q have been rejected in selecting the second user dependent RSA cryptographic value;
means for selecting at least one of a new first secret seed value ($W_p$), a new second secret seed value ($W_q$) and a new third randomization value (IV) if $2^{16}-1$ candidates for q have been rejected in selecting the second user dependent RSA cryptographic value; and
means for restarting the cryptographic generation utilizing the first and second secret seed values and third randomization value if either $2^{16}-1$ candidates for p have been rejected in selecting the first user dependent RSA cryptographic value or if $2^{16}-1$ candidates for q have been rejected in selecting the second user dependent RSA cryptographic value.

39. A system according to claim 22, wherein the means for generating a first initial value comprises:
means for mixing a concatenation of $W_q$ and $IV_q$ utilizing a publicly known mixing function;
means for concatenating $W_p$ and $IV_p$; and
means for EXCLUSIVE-ORing the mixed concatenation of $W_q$ and $IV_q$ and the concatenation $W_p$ and $IV_p$ to provide the first initial value ($XX_p$); and
wherein the means for generating a second initial value comprises:
means for EXCLUSIVE ORing p and $IV_p$;
means for mixing the EXCLUSIVE OR of p and $IV_p$ utilizing the publicly known mixing function;
means for concatenating $W_q$ and $IV_q$; and
means for EXCLUSIVE-ORing the mixed EXCLUSIVE OR of p and $IV_p$ and the concatenation of $W_q$ and $IV_q$ to provide the second initial value ($XX_q$).

40. A system according to claim 24, further comprising means for determining that the RSA cryptographic values are not authentic if p' and q' are values outside the user defined segments of the first and second intervals.

41. A system according to claim 24, wherein the first of the two prime numbers is a smaller of the two prime numbers.

42. A system according to claim 24 wherein the means for recovering first and second candidate seed values $W_p'$ and $W_q'$ from the first and second candidate cryptographic values p' and q' and from the third publicly known seed value IV comprises:

means for inverse mapping the second candidate value q' to provide a first initial value $S_q$;

means for EXCLUSIVE ORing the first candidate cryptographic value p' and $IV_p$;

means for mixing the EXCLUSIVE OR of the first candidate cryptographic value p' and $IV_p$ with the publicly known mixing function;

means for EXCLUSIVE ORing the mixed EXCLUSIVE OR of the first candidate cryptographic value p' and $IV_p$ with $IV_q$ to provide a first known value ($N_q$) having a length (j);

means for determining if a value corresponding to the j least significant bits of $S_q$ is less than the first known value $N_q$;

means for EXCLUSIVE ORing the n−j most significant bits of the mixed concatenation of the first candidate cryptographic value p' and $IV_p$ with the n−j most significant bits of $S_q$ if the value corresponding to the j least significant bits of the first subsequent value is not less than the first known value $N_q$, to provide the second candidate seed value;

means for EXCLUSIVE ORing the n−j most significant bits of the mixed concatenation of the first candidate cryptographic value p' and $IV_p$ with 1 subtracted from the value corresponding to the n−j most significant bits of $S_q$ if the value corresponding to the j least significant bits of the first subsequent value is less than the first known value $N_q$, to provide the second candidate seed value;

means for inverse mapping the first candidate value p' to provide a second initial value $S_p$;

means for concatenating the second candidate seed value and $IV_q$;

means for mixing the concatenation of the second candidate seed value and $IV_q$ with the publicly known mixing function;

means for EXCLUSIVE ORing the mixed concatenation of the second candidate seed value and $IV_q$ with $IV_p$ to provide a second known value $N_p$ having a length (j);

means for determining if a value corresponding to the j least significant bits of $S_p$ is less than the second known value $N_p$;

means for EXCLUSIVE ORing the n−j most significant bits of the mixed concatentation of the second candidate seed value and $IV_q$ with the n−j most significant bits of $S_p$ if value corresponding to the j least significant bits of the second subsequent value is not less than the second known value $N_p$, to provide the first candidate seed value; and means for EXCLUSIVE ORing the n−j most significant bits of the mixed concatenation of the second candidate seed value and $IV_q$ with 1 subtracted from the value corresponding to the n−j most significant bits of $S_p$ if the value corresponding to the j least significant bits of the second subsequent value is less than the second known value $N_p$, to provide the first candidate seed value.

43. A computer program product according to claim 25, further comprising computer program code which generates auxiliary prime divisors corresponding to the first user dependent RSA cryptographic value (p) and the second user dependent RSA cryptographic value (q).

44. A computer program product according to claim 43, wherein the auxiliary prime divisors are generated based upon the first secret seed value ($W_p$), the second secret seed value ($W_q$) and the third randomization value (IV).

45. (previously presented) A computer program product according to claim 44, wherein $p_0$ is a publicly known prime number whose length is at least n bits and g is a public generator, and wherein the computer program code which generates auxiliary prime divisors comprises:

computer program code which concatenates the first secret seed value ($W_p$), the second secret seed value ($W_q$) and the third randomization value (IV) so as to provide an exponent value (X);

computer program code which determines an initial random value by determining $Y=g^X(\bmod p_0)$;

computer program code which selects initial prime search values from the initial random value;

computer program code which sets the most significant bit of the initial prime search values to "1" to provide final prime search values; and computer program code which selects as the prime divisors the smallest prime value greater than or equal to the final prime search values.

46. A computer program product according to claim 45, further comprising:

computer program code which selects at least one of a new first secret seed value ($W_p$), a new second secret seed value ($W_q$) and a new third randomization value (IV) if the length of at least one of the prime divisors is greater than the length of the final prime search values; and computer program code which re-generates the prime divisors if the length of at least one of the prime divisors is greater than the length of the final prime search values.

47. A computer program product according to claim 45, wherein the initial prime search values have a first length if a public encryption exponent (e) has an odd value and a second length of the public encryption exponent (e) has an even value.

48. A computer program product according to claim 46, wherein the first length is 120 bits and the second length is 118 bits.

49. A computer program product according to claim 25, wherein the entity specific segments comprise the segments $[A+(B(C-A))/2^b, A+((B+1)(C-A))/2^b]$ wherein A and C are the endpoints of the respective intervals and the entity specific information comprises b bits.

50. A computer program product according to claim 49, wherein the RSA cryptographic values comprise n bits and wherein the first interval comprises RSA cryptographic values from the set $[\sqrt{2}(2^{n-1}), 2^{n-1}+2^{n-3/2}]$ and the second interval comprises RSA cryptographic values from the set of $[2^{n-1}+2^{n-3/2}]$.

51. A computer program product according to claim 50, wherein the binary size of the RSA cryptographic values are 2n, a size m is n−b−2 and wherein the computer program code which maps the first initial value comprises:

computer program code which linearly maps the first initial value to a entity specific segment of the first interval utilizing the obtained entity specific information (B) utilizing the linear mapping function $$G_{1,U}(x) = 4\left(1 - \frac{1}{\sqrt{2}}\right)x + \sqrt{2}\,2^{n-1} + 4\left(1 - \frac{1}{\sqrt{2}}\right)(B-1)2^{m-1};\text{ and}$$

computer program code which selects as the mapped first initial value ($X_p$) the integer value which is not greater than the first initial value ($XX_p$) mapped utilizing the mapping function $G_{1,U}$; and wherein the computer program code which maps the second initial value comprises computer program code which linearly maps the second initial value to a entity specific segment of the second interval utilizing the obtained entity specific information (B) utilizing the linear mapping function $$G_{2,U}(x) = 4\left(1 - \frac{1}{\sqrt{2}}\right)x + 2^{n-1} + 2^{n-3/2} + 4\left(1 - \frac{1}{\sqrt{2}}\right)(B-1)2^{m-1};\text{ and}$$

computer program code which selects as the mapped second initial value ($X_q$) the integer value which is not greater than the second initial value ($XX_q$) mapped utilizing the mapping function $G_{2,U}$.

52. A computer program product according to claim 25, further comprising:
computer program code which determines if a candidate for p is considered outside the range of RSA cryptographic values in the entity specific segment of the first interval;
computer program code which selects at least one of a new first secret seed value ($W_p$), a new second secret seed value ($W_q$) and a new third randomization value (IV) if a candidate for p is considered outside the range of RSA cryptographic values in the entity specific segment of the first interval;
computer program code which determines if a candidate for q is considered outside the range of RSA cryptographic values in the entity specific segment of the second interval;
computer program code which selects at least one of a new first secret seed value ($W_p$), a new second secret seed value ($W_q$) and a new third randomization value (IV) if a candidate for q is considered outside the range of RSA cryptographic values in the entity specific segment of the second interval; and
computer program code which restarts the cryptographic value generation utilizing the first and second secret seed values and third randomization value if either a candidate for p is considered outside the range of RSA cryptographic values in the entity specific segment of the first interval or if a candidate for q is considered outside the range of RSA cryptographic values in the entity specific segment of the second interval.

53. A computer program product according to claim 25 further comprising:
computer program code which determines if $2^{16}-1$ candidates for p have been rejected in selecting the first user dependent RSA cryptographic value;
computer program code which selects at least one of a new first secret seed value ($W_p$), a new second secret seed value ($W_q$) and a new third randomization value (IV) if $2^{16}-1$ candidates for p have been rejected in selecting the first user dependent RSA cryptographic value;
computer program code which determines if $2^{16}-1$ candidates for q have been rejected in selecting the second user dependent RSA cryptographic value;
computer program code which selects at least one of a new first secret seed value ($W_p$), a new second secret seed value ($W_q$) and a new third randomization value (IV) if $2^{16}-1$ candidates for q have been rejected in selecting the second user dependent RSA cryptographic value; and
computer program code which restarts the cryptographic generation utilizing the first and second secret seed values and third randomization value if either $2^{16}-1$ candidates for p have been rejected in selecting the first user dependent RSA cryptographic value or if $2^{16}-1$ candidates for q have been rejected in selecting the second user dependent RSA cryptographic value.

54. A computer program product according to claim 25, wherein the computer program code which generates a first initial value comprises:
computer program code which mixes a concatenation of $W_q$ and $IV_q$ utilizing a publicly known mixing function;
computer program code which concatenates $W_p$ and $IV_p$; and
computer program code which EXCLUSIVE-ORs the mixed concatenation of $W_q$ and $IV_q$ and the concatenation $W_p$ and $IV_p$ to provide the first initial value ($XX_p$); and
wherein the computer program code which generates a second initial value comprises:
computer program code which EXCLUSIVE ORs p and $IV_p$;
computer program code which mixes the EXCLUSIVE OR of p and $IV_p$ utilizing the publicly known mixing function;
computer program code which concatenates $W_q$ and $IV_q$; and
computer program code which EXCLUSIVE-ORs the mixed EXCLUSIVE OR of p and $IV_p$ and the concatenation of $W_q$ and $IV_q$ to provide the second initial value ($XX_q$).

55. A computer program product according to claim 27, further comprising computer program code which determines that the RSA cryptographic values are not authentic if p' and q' are values outside the user defined segments of the first and second intervals.

56. A computer program product according to claim 27, wherein the first of the two prime numbers is a smaller of the two prime numbers.

57. A computer program product according to claim 27 wherein the computer program code which recovers first and second candidate seed values $W_p'$ and $W_q'$ from the first and second candidate cryptographic values p' and q' and from the third publicly known seed value IV comprises:
computer program code which inverse maps the second candidate value q' to provide a first initial value $S_q$;
computer program code which EXCLUSIVE ORs the first candidate cryptographic value p' and $IV_p$;
computer program code which mixes the EXCLUSIVE OR of the first candidate cryptographic value p' and $IV_p$ with the publicly known mixing function;

computer program code which EXCLUSIVE ORs the mixed EXCLUSIVE OR of the first candidate cryptographic value p' and $IV_p$ with $IV_q$ to provide a first known value ($N_q$) having a length (j);

computer program code which determines if a value corresponding to the j least significant bits of $S_q$ is less than the first known value $N_q$;

computer program code which EXCLUSIVE ORs the n−j most significant bits of the mixed concatenation of the first candidate cryptographic value p' and $IV_p$ with the n−j most significant bits of $S_q$ if the value corresponding to the j least significant bits of the first subsequent value is not less than the first known value $N_q$, to provide the second candidate seed value;

computer program code which EXCLUSIVE ORs the n−j most significant bits of the mixed concatenation of the first candidate cryptographic value p' and $IV_p$ with 1 subtracted from the value corresponding to the n−j most significant bits of $S_q$ if the value corresponding to the j least significant bits of the first subsequent value is less than the first known value $N_q$, to provide the second candidate seed value;

computer program code which inverse maps the first candidate value p' to provide a second initial value $S_p$;

computer program code which concatenates the second candidate seed value and $IV_q$;

computer program code which mixes the concatenation of the second candidate seed value and $IV_q$ with the publicly known mixing function;

computer program code which EXCLUSIVE ORs the mixed concatenation of the second candidate seed value and $IV_q$ with $IV_p$ to provide a second known value $N_p$ having a length (j);

computer program code which determines if a value corresponding to the j least significant bits of $S_p$ is less than the second known value $N_p$;

computer program code which EXCLUSIVE ORs the n−j most significant bits of the mixed concatentation of the second candidate seed value and $IV_q$ with the n−j most significant bits of $S_p$ if value corresponding to the j least significant bits of the second subsequent value is not less than the second known value $N_p$, to provide the first candidate seed value; and computer program code which EXCLUSIVE ORs the n−j most significant bits of the mixed concatenation of the second candidate seed value and $IV_q$ with 1 subtracted from the value corresponding to the n−j most significant bits of $S_p$ if the value corresponding to the j least significant bits of the second subsequent value is less than the second known value $N_p$, to provide the first candidate seed value.

* * * * *

UNITED STATES PATENT AND TRADEMARK OFFICE
CERTIFICATE OF CORRECTION

PATENT NO. : 6,928,163 B1
DATED : August 9, 2005
INVENTOR(S) : S. M. Matyas et al.

It is certified that error appears in the above-identified patent and that said Letters Patent is hereby corrected as shown below:

Column 18,
Line 1, replace the formula "$[\sqrt{2}(2^{n-1}),2^n+2^{n-3/2}]$" with -- $[\sqrt{2}(2^{n-1}),2^{n-1}+2^{n\ 3/2}]$ --.

Column 23,
Line 31, replace the formula "$[\sqrt{2}(2^{n-1}),2^n+2^{n-3/2}]$" with -- $[\sqrt{2}(2^{n-1}),2^{n-1}+2^{n\ 3/2}]$ --.

Column 26,
Line 10, delete "(previously presented)".
Line 63, replace the formula "$[2^{n-1}+2^{n\ 3/2}]$" with -- $[2^{n-1}+2^{n-3/2},2^n]$ --.

Signed and Sealed this

Thirtieth Day of May, 2006

JON W. DUDAS
*Director of the United States Patent and Trademark Office*